United States Patent
Ito et al.

(10) Patent No.: US 7,184,167 B1
(45) Date of Patent: Feb. 27, 2007

(54) DATA PROCESSING FOR ARRANGING TEXT AND IMAGE DATA ON A SUBSTRATE

(75) Inventors: Chitoshi Ito, Kasugai (JP); Hirokazu Kuwabara, Nagoya (JP); Tatsuhiro Ikedo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1326 days.

(21) Appl. No.: 09/672,033

(22) Filed: Sep. 29, 2000

(30) Foreign Application Priority Data

| Sep. 30, 1999 | (JP) | ................................. 11-279317 |
| Sep. 30, 1999 | (JP) | ................................. 11-279318 |
| Sep. 30, 1999 | (JP) | ................................. 11-279471 |
| Sep. 30, 1999 | (JP) | ................................. 11-279472 |

(51) Int. Cl.
*G06F 15/00* (2006.01)

(52) U.S. Cl. ..................... 358/1.18; 358/1.13

(58) Field of Classification Search ................ 358/1.1, 358/1.5, 1.12, 1.13, 1.14, 1.15, 1.18, 462, 358/448, 453

See application file for complete search history.

(56) References Cited

U.S. PATENT DOCUMENTS

| 5,287,538 | A |   | 2/1994  | Kawakami et al.            |
| 5,430,808 | A | * | 7/1995  | Baird et al. ........... 382/176 |
| 5,465,304 | A | * | 11/1995 | Cullen et al. ........... 382/176 |
| 5,555,362 | A | * | 9/1996  | Yamashita et al. ........ 715/517 |
| 5,659,770 | A |   | 8/1997  | Yamada                     |
| 5,689,342 | A | * | 11/1997 | Nakatsuka ............. 358/296 |
| 5,856,877 | A |   | 1/1999  | Burger et al.              |
| 6,163,623 | A | * | 12/2000 | Ohta .................... 382/176 |
| 6,512,848 | B2 | * | 1/2003 | Wang et al. ........... 382/176 |
| 6,690,492 | B2 | * | 2/2004 | Nakajima ............. 358/462 |
| 6,735,740 | B2 | * | 5/2004 | Sakai et al. ........... 715/526 |

* cited by examiner

*Primary Examiner*—Mark Wallerson
(74) *Attorney, Agent, or Firm*—Oliff & Berridge, PLC

(57) ABSTRACT

In a data processing, a print area is divided into a text area for arranging text data and an image area for arranging image data. The image data is proportionally modified before arranging the data in the image area. Also, the text data is reformatted by, for example, deleting unnecessary line feed codes before arranging the data in the text area.

46 Claims, 25 Drawing Sheets

DATA PROCESSING FOR ARRANGING TEXT AND IMAGE DATA ON A SUBSTRATE

BACKGROUND OF THE INVENTION

1. Field of the Invention

The present invention relates to a data processing method, device and program for effectively arranging text and image data in a well-organized manner.

2. Description of the Prior Art

With the recent progress in computer technology and the growth of the Internet, computer users can now quickly access a wide range of information via the World Wide Web (WWW) and easily display desired character arrays and images on reference software called Web browsers (hereinafter referred to as browsers). However, since there are occasions when the user may wish to access such information from places in which a computer is not available, the user must print out the accessed data on paper in order to reference the data at those locations. Most browsers support a printing function for this purpose. Using this function, the easiest method is to print out the character arrays and images exactly as they appear on the browser onto A4-size paper or the like.

In many cases, however, the user requires only a portion of the data displayed in the browser. By using the print function in the browser to print out the data, all displayed data including unnecessary data is printed. As a result, there are an increased number of printed sheets, which is a waste of paper. These sheets can be heavy and difficult to carry; and they take up much storage room. Further, searching through all the unnecessary data for desired data can be time-consuming.

In order to avoid these problems, the user must be able to extract only the desired data displayed in the browser and insert this data into a word processing program using the copy and paste functions or the like. Using various functions of the word processing program, the user must be able to edit the extracted data into a desired layout.

Unfortunately, the process of extracting necessary data from a browser and inserting the data into word processing software is an extremely complex one with conventional programs. When the user wishes to print both text and image data extracted from a browser onto a sheet of paper of a desired size, for example, the area on this sheet of paper must be divided into text areas for arranging text data and image areas for arranging image data. Further, operations must be performed to arrange each portion of text data and image data in a desired manner into these areas. Such operations require time and effort.

SUMMARY OF THE INVENTION

In view of the foregoing, it is an object of the present invention to provide a data processing method, device and program for processing text and image data such that the data can be printed on a sheet of paper having a desired size in a well-organized manner without the need for performing complex processes.

To achieve the above and other objects, the present invention provides, according to one aspect of the inventions a data processing program serving as a basic program includes an identification program for identifying whether a piece of data in a block of data containing one or plural pieces of data is text data or image data; a repeat program for repeatedly executing the identification program with respect to each piece of data contained in the block of data; a determination program for determining whether the one or plural pieces of data as identified through the execution of the repeat program include only the text data, only the image data, or both the text data and the image data, and providing a determination result; and a layout program for executing layout of the one or plural pieces of data according to a layout pattern that differs depending upon the determination result.

A print program, a first cut program, and a second cut program can further be included in the basic program. The print program is provided for instructing to print the one or plural pieces of data on an elongated, web-like substrate having a width according to the layout pattern used in the layout program. The first cut program is provided for instructing to cut the substrate along the width each time the substrate is printed a predetermined length. The second cut program is provided for instructing, when printing of the one or plural pieces of data has finished, to out the substrate along a line between a printed region and a non-printed region of the substrate.

Preferably, identification executed by the identification program is made based on a format identifier attendant to each piece of data.

A line feed code detection program, a prescribed code detection program, and a line feed code deletion program can further be included in the basic program. The line feed code detection program is provided for detecting, when determination made by the determination program indicates that the one or plural pieces of data includes only the text data, a line feed code that may exist in the text data. The prescribed code detection program is provided for detecting a prescribed code that may exist immediately before or after the line feed code detected during detection of the line feed code by the line feed code detection program. The line feed code deletion program is provided for deleting, when detection made by the prescribed code detection program indicates that the prescribed code is not detected through detection of the prescribed code by the prescribed code detection program, the line feed code detected through detection of the line feed code by the line feed code detection program. The prescribed code includes a punctuation code representative of a punctuation mark, a delimiting code representative of a period, comma, colon, or semicolon, and itemization code designed for using at a head of each line of a printed document in an itemization.

A space character code detection program, a space counter control program, a space code number determination program, and a space code deletion program can further be included in the basic program. The space character code detection program is provided for detecting, when determination made by the determination program indicates that the one or plural pieces of data include only the text data, a space character code that may exist in the text data. The space counter control program is provided for incrementing a count value of a space counter by one each time when the space character code is consecutively detected from the text data, and initializing the count value of the space counter to zero when a code other than the space character code is detected during detection the space character code by the space character code detection program. The space code number determination program is provided for determining, when the space character code is not detected from the text data, that the count value of the space counter is equal to or greater than two indicating that two or more than two space character codes consecutively exist in the text data. The space code deletion program is provided for deleting the two or more than two space character codes when determination made in the space code number determination program indicates that the count value of the space counter is equal to or greater than two.

A space character detection program and a space character deletion program can further be included in the basic program. The space character detection program is provided for detecting that only one space character exists at a head of a first line of the text data when determination made by the determination program indicates that the one or plural pieces of data includes only the text data. The space character deletion program is provided for deleting the one space character when determination made in the space character detection program indicates that a space character exists at the head of the first line of the text data.

An arranging order setting program and a proportional image data producing program can further be included in the basic program. The arranging order setting program is provided for setting, when determination made by the determination program indicates that the one or plural pieces of data includes only the image data, an order in which the one or plural pieces of data are arranged on a layout area. The proportional image data producing program is provided for producing a proportionally enlarged or proportionally reduced image data so that each piece of data is proportionally enlarged or proportionally reduced to a maximum size that fits within an unoccupied layout area, the proportionally enlarged or proportionally reduced image data being produced in the order in which the one or plural pieces of data are arranged on the layout area. The layout program in the basic program executes arranging in an orientation relative to the layout area, the proportionally enlarged or proportionally reduced image data on the layout area in the order set by the arranging order set program. A layout orientation determining program can further be included for determining the orientation in which the proportionally enlarged or proportionally reduced image data are arranged on the layout area so that a firstly produced image data has a size that fits within the layout area.

A divided layout area setting program can further be provided for dividing the layout area into a predetermined number of partitioned areas. The proportional image data producing program produces the proportionally enlarged or proportionally reduced image data so that each piece of data is proportionally enlarged or proportionally reduced to a maximum size that fits within a designated one of the predetermined number of partitioned areas when the proportionally enlarged or proportionally reduced image data is arranged in an orientation relative to the layout area. A comparison program can further be provided for comparing an enlargement/reduction ratio of the proportionally enlarged or proportionally reduced image data with a predetermined minimum reduction ratio. The layout program executes arranging the proportionally reduced image data over two or more partitioned areas upon dividing the proportionally reduced image data into a corresponding number when comparison executed by the comparison program indicates that the enlargement/reduction ratio of the proportionally reduced image data is smaller than the predetermined minimum reduction ratio. A warning issuing program can further be provided for issuing a warning to notify a user that the enlargement/reduction ratio of the proportionally reduced image data arranged over the two or more partitioned areas is smaller than the predetermined minimum reduction ratio.

According to another aspect of the invention, there is provided a data processing device including area dividing means for dividing a prescribed area into a text area for laying out text data and an image area for laying out image data according to a predetermined ratio; image layout means for laying out one or more image data, each of which has been enlarged or reduced by the same proportion, into the image area; and text layout means for laying out one or more text data in the text area.

With this construction, the prescribed layout area is divided into a text area and an image area according to a predetermined ratio and a proportional image data and text data are automatically arranged in the appropriate areas. Accordingly, text and image data can be arranged in prescribed areas in a well-organized and compact manner without the need for performing complex processes.

In the present invention, the terms layout and arrange refer to the process of assigning addresses corresponding to relative positions within the prescribed areas for actual displaying and printing to the text and image data, and writing these assignments to a storage device. Text data refers to data for character arrays containing characters and symbols that are expressed by a prescribed code such as Shift-JIS or UNICODE and includes data expressed in file formats such as txt, html, rtf, and other formats written by prescribed word processing software. Image data refers to data representing diagrams and the like by setting two-dimensionally arranged dots on or off and includes data expressed in file formats such as gif, jpeg, and bmp. Table data can be treated as text data by replacing the table grid by boxed lines, but it is better treated as table data in order to avoid errors in line positions. Any other data that is not text or image data should be treated as whichever type is most appropriate.

The text layout means arranges text data in portions of the image area not occupied by image data. With this configuration, text data can be laid out in unoccupied areas of the image area, enabling the data to be arranged more compactly.

The occupation ratio is variable. Accordingly, an optimal ratio can be selected according to the proportional size of image data and text data, thereby enabling this data to be arranged in a more organized manner.

The data processing device can further include comparing means for comparing the enlarged/reduced ratio of the proportional image data to a predetermined minimum reduction percentage; and image area enlarging means for enlarging the proportion of the image area when the enlarged/reduced ratio of the proportional image data is smaller than the minimum reduction percentage based on the results of the comparison performed by the comparing device. By enlarging the proportion of the image area when the enlarged/reduced ratio of the proportional image data is smaller than the minimum reduction percentage, it is possible to prevent the creation of proportional image data that has been reduced too much and is difficult to see clearly.

The data processing device can further include fill-in determining means for determining, when the text data is arranged in an over-hanging text area positioned adjacent to the image area, whether the number of characters in a line of text data displayed at a prescribed point size in the over-hanging text area exceeds a predetermined number. Accordingly, it is possible to prevent text data from becoming too small to see when they number of characters in a line of text data becomes less than the prescribed number.

The data processing device can further include text area enlarging means for enlarging the text area when the text data displayed at a prescribed point size is not contained within the text area. With this configuration, it is possible to display text data legibly without affecting the image display.

According to another aspect of the invention, there is provided a data processing device including line feed code/space character detecting means, prescribed code detecting means, line feed code deletion means, a space counter, count value determining means, and space character code deleting means. The line feed code/space character detecting means is provided for detecting a line feed code and a space character which may exist in text data. The prescribed code detecting means is provided for detecting a prescribed code that may exist immediately before or after the line feed code detected by the line feed code/space character detecting means. The line feed code deletion means is provided for deleting, when detection made by the prescribed code detecting means indicates that the prescribed code is not detected, the line feed code detected by the line feed code detecting means. The space counter is incremented by one each time when the line feed code/space character detecting means consecutively detects the space character and is initialized to zero when a code other than the space character code is detected by the line feed code/space character detecting means. The count value determining means is provided for determining, when the code other than the space character code is detected by the line feed code/space character detecting means, that a count value of the space counter is equal to or greater than two indicating that two or more than two space character codes consecutively exist in the text data. The space character code deleting means is provided for deleting the two or more than two space character codes when determination made by the count value determining means indicates that the count value of the space counter is equal to or greater than two.

A blank line flag storing means, blank line flag control means, and space character deletion means can further be included. The blank line flag storing means is provided for storing a blank line flag representing whether a character other than a space character exists before a line feed code in one logical line. The blank line flag control means is provided for controlling on/off of the blank line flag in such a manner that when the space counter is initialized, and when the line feed code/space character detecting means detects the line feed code and immediately before the space counter is initialized, the blank line flag is set to on. On the other hand, when the line feed code/space character detecting means detects a code or a character other than the line feed code and the space character and immediately before the space counter is initialized, the blank line flag is set to off. The space character deletion means is provided for deleting one space character existing at a head of a first line of the text data if the blank line flag is on when determination made by the count value determining means indicates that the value of the space counter is not two or more than two.

The data processing device can further include space character deletion means for deleting all space characters existing in the logical line if the blank line flag is on when the line feed code/space character detecting means detects the line feed code.

BRIEF DESCRIPTION OF THE DRAWINGS

The particular features and advantages of the invention as well as other objects will become apparent from the following description taken in connection with the accompanying drawings, in which:

FIG. 11 is an explanatory diagram showing how text data is reformatted;

FIG. 12 is an explanatory diagram showing how text data is reformatted;

FIG. 13 is an explanatory diagram showing how text data is reformatted;

DETAILED DESCRIPTION OF THE PREFERRED EMBODIMENT

A data processing method and device according to a preferred embodiment of the present invention will be described while referring to the accompanying drawings.

Figure 1:
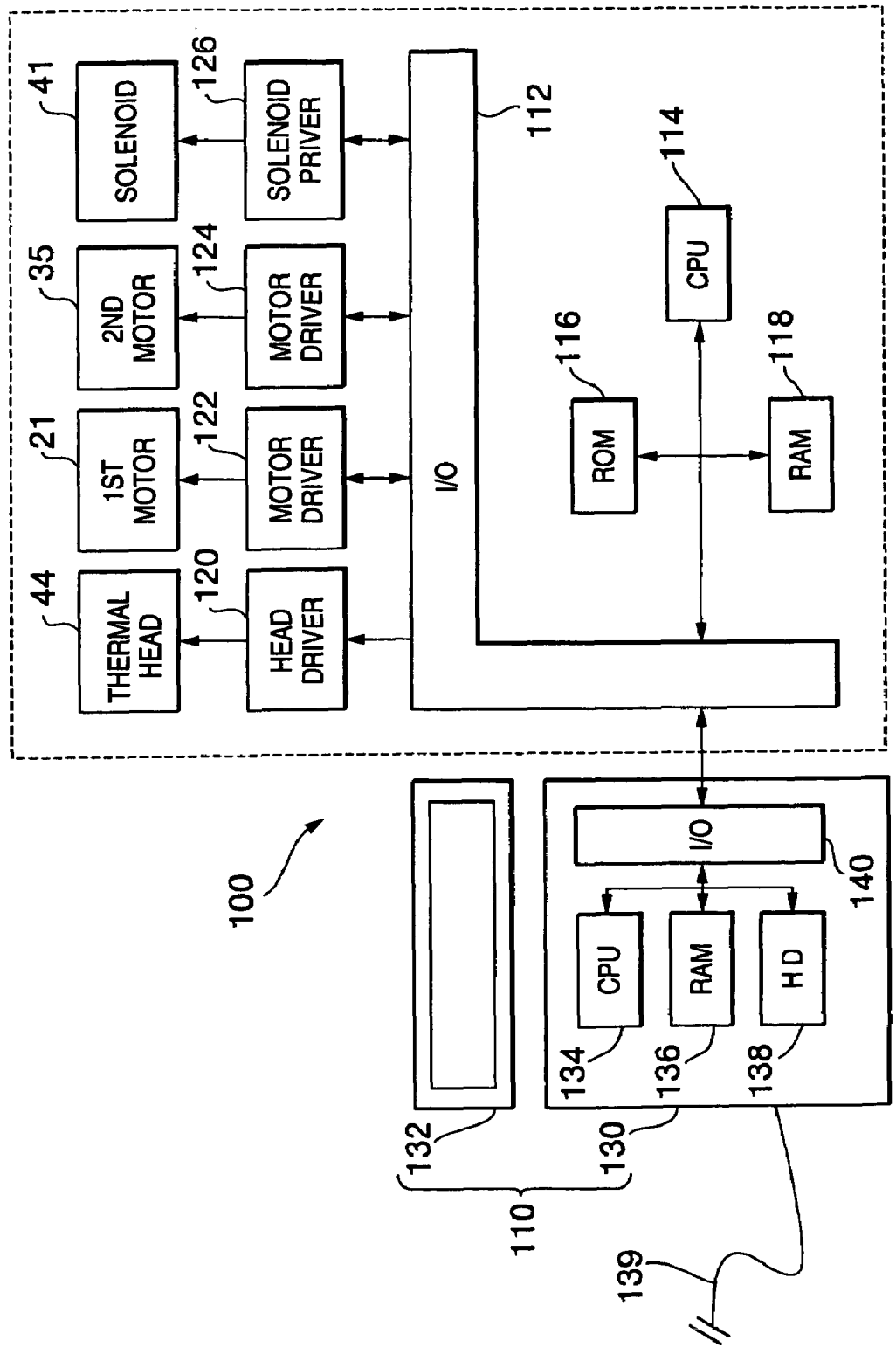
FIG. 1 is a block diagram showing a label manufacturing device having a data processing apparatus according to the present invention.

FIG. 1 is a block diagram showing the construction of a label producing apparatus 100, which is the data processing device of the present embodiment. The label producing apparatus 100 includes a personal computer 110 and a sheet processing device 11 connected to the personal computer 110. First, the construction of the sheet processing device 11 (hereinafter referred to as a cutting printer) will be described.

Figure 2:
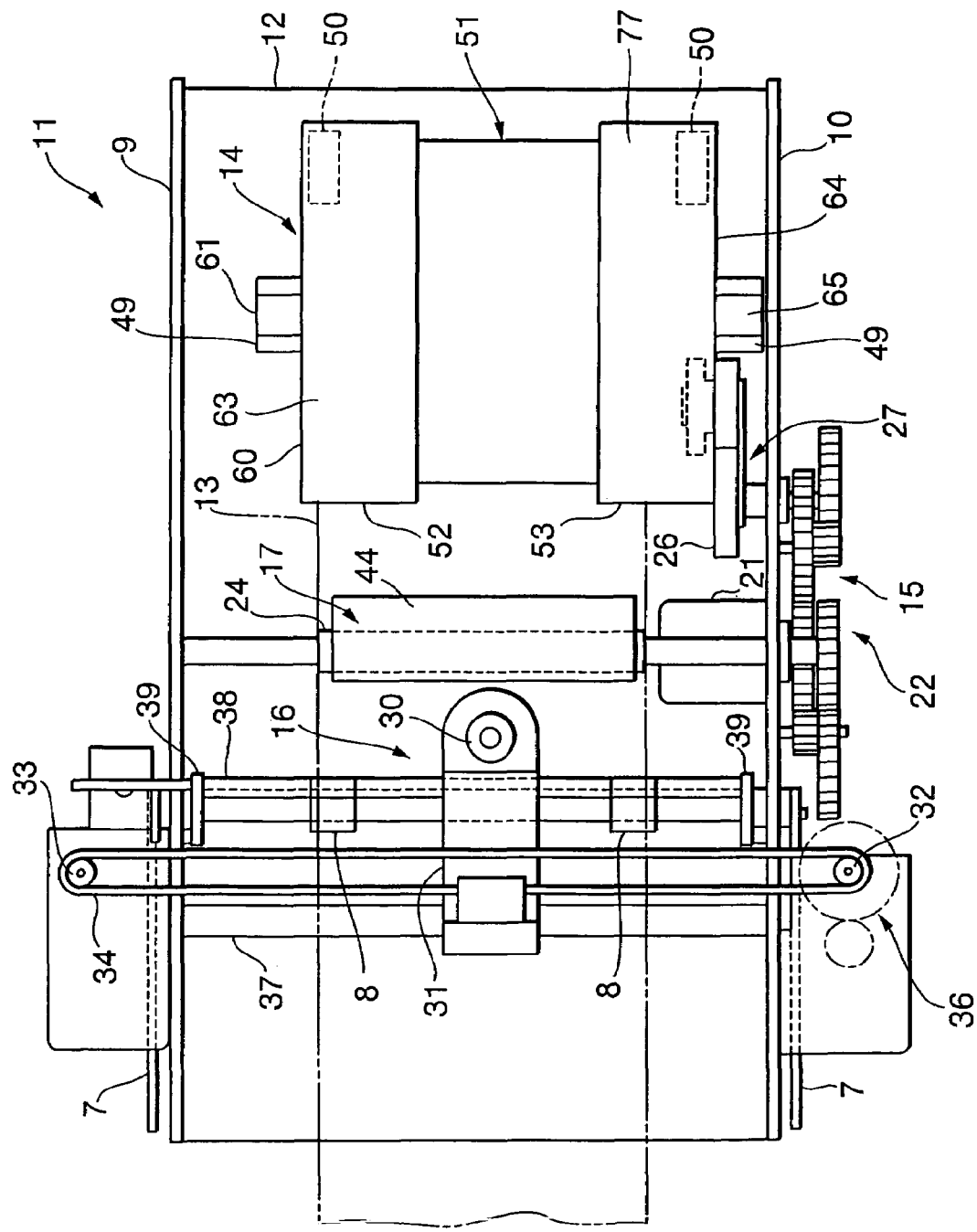
FIG. 2 is a plan view showing the construction of the relevant portion in the cutting printer of FIG. 1.
Figure 3:
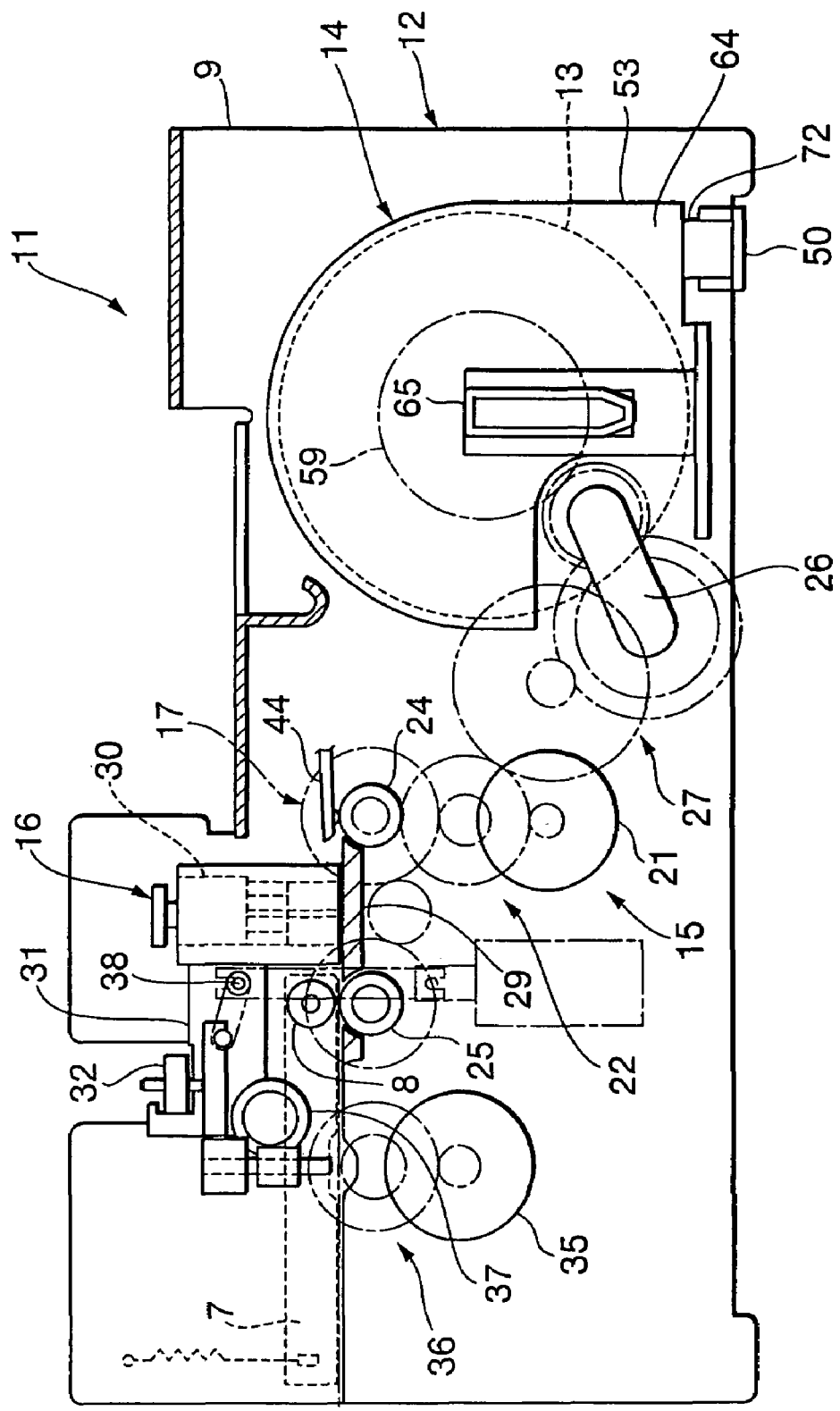
FIG. 3 is a cross-sectional view showing the relevant portion of the cutting printer.

FIGS. 2 and 3 show the structure of the cutting printer 11. The cutting printer 11 includes a frame 12 provided with left and right walls 9 and 10: a role sheet unit 14 rotatable supported in the frame 12 and wrapped with a tack sheet 13; a conveying mechanism 15 for reciprocally conveying the tack sheet 13 in forward and backward directions; a cutting mechanism 16 for cutting the tack sheet 13 conveyed by the conveying mechanism 15; and an image forming mechanism 17 disposed upstream from the cutting mechanism 16 in relation to the forward conveying direction (discharging direction) of the tack sheet 13 for forming prescribed images on the tack sheet 13.

Figure 5:
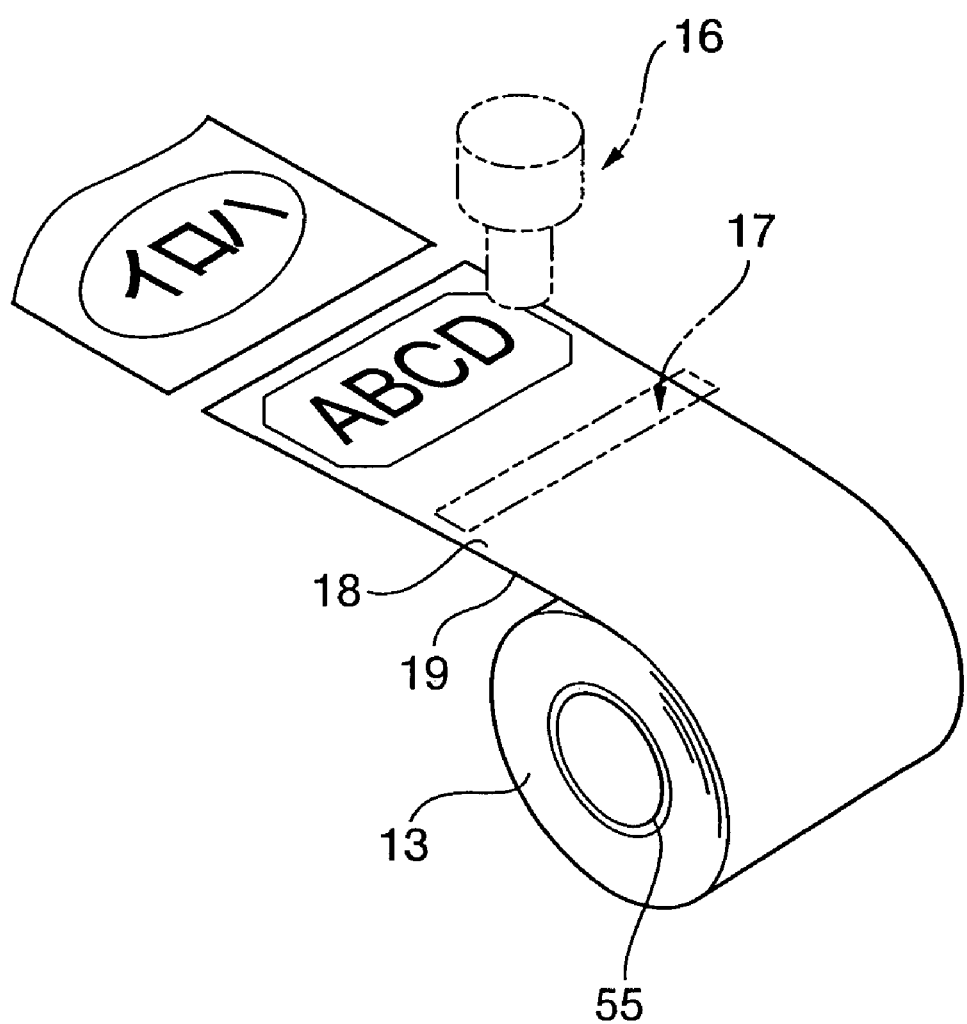
FIG. 5 is a conceptual diagram showing a perspective view of the approximate positional relationship between the roll shaft unit, the cutting mechanism, and the image forming mechanism of the cutting printer.

As shown in FIG. 5, the tack sheet 13 is wound about a cylindrical core 55 to form a roll sheet 51 (see FIG. 2). The tack sheet 13 is formed of two layers; a pressure sensitive adhesive sheet 18 having a printable top surface and a pressure sensitive adhesive applied to the bottom surface and a mold release sheet 19 mounted on the bottom surface of the pressure sensitive adhesive sheet 18.

As shown in FIG. 3, the conveying mechanism 15 includes a platen roller 24 serving as a component of the image forming mechanism 17; a discharge roller 25 disposed downstream from the cutting mechanism 16; and a slave roller 8 positioned opposite the discharge roller 25, between which two components the tack sheet 13 is interposed. A tension plate 7 supports a slave roller 8 and urges the slave roller a via a spring to apply pressure against the discharge roller 25. A first drive motor 21 disposed in the frame 12 drives the platen roller 24 and discharge roller 25 via a first gear train 22 in order to convey the tack sheet 13 reciprocally in the forward and reverse directions.

A gear 59 is provided on a flange gear (not shown) of a roll sheet unit 14. The first drive motor 21 drives the gear 59, the drive movement being transferred via a second gear train 27 having a planetary gear mechanism 26. The planetary gear mechanism 26 engages with the gear 59 only when conveying the tack sheet 13 in the reverse direction and does not engage with the gear 59 when conveying the tack sheet 13 in the forward direction. Therefore, when conveying the tack sheet 13 in the forward direction, the pulling force of the rotating platen roller 24 and discharge roller 25 rotates the roll sheet 51 on the tack sheet 13. When conveying the tack sheet 13 in the reverse direction, the roll sheet 51 is driven by the first drive motor 21 to rotate in the reverse direction.

Next, the cutting mechanism 16 will be described. The cutting mechanism 16 is provided with a cutting head 29 for receiving the downstream end of the tack sheet 13: a cutting unit 30 positioned opposite the cutting head 29 for interposing the tack sheet 13 therebetween: and a carriage 31 on which the cutting unit 30 is detachably mounted.

Figure 4:
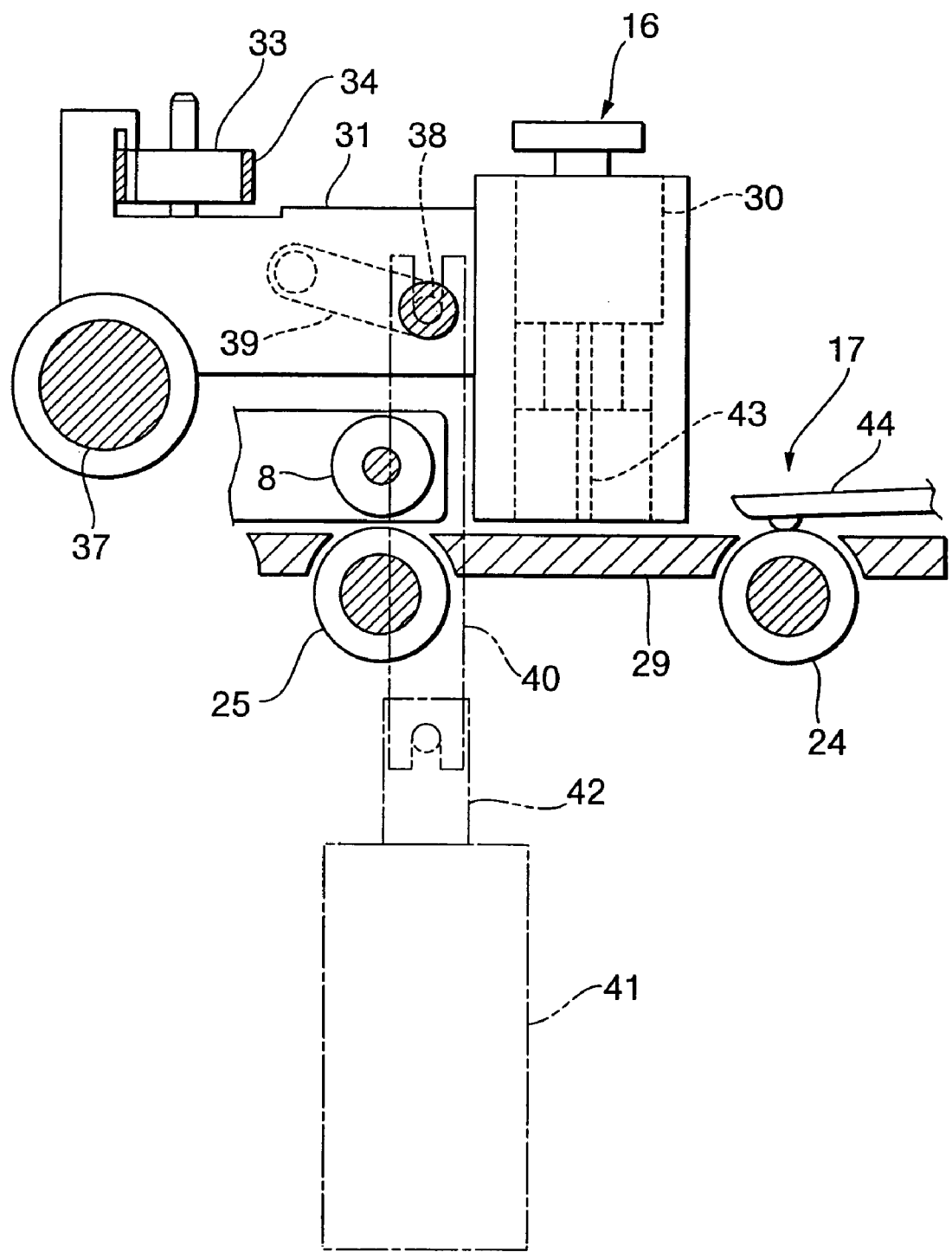
FIG. 4 is a side cross-sectional view showing the cutting mechanism for the cutting printer.

As shown in FIG. 4, the cutting unit 30 has a cutter 43 for cutting the tack sheet 13 on its downstream end. An elevating mechanism (not shown) is disposed in the cutting unit 30 for selectively supporting the cutter 43 in a full cut position for cutting the mold release sheet 19 together with the pressure sensitive adhesive sheet 18 or a half cut position for cutting only the pressure sensitive adhesive sheet 18.

As shown in FIG. 2, the carriage 31 is attached to one point along a timing belt 34. The endless belt-shaped timing belt 34 is wrapped around a pair of pulleys 32 and 33 disposed one on each of the outer sides of the right walls 9 and 10. As shown in FIG. 3, a second drive motor 35 disposed outside the 10 drives the pulley 32. The drive movement of the second drive motor 35 is transferred to the pulley 32 via a third gear train 36 having a bevel gear or the like. As a result, the carriage 31 moves reciprocally in a direction approximately orthogonal to the conveying direction of the tack sheet 13 (along the widthwise direction of the sheet).

As shown in FIG. 4, a main guide shaft 37 penetrates and is supported by the right walls 9 and 10 at a position near the end of the carriage 31 opposite the and on which the cutting unit 30 is mounted. The carriage 31 is slidingly supported on the main guide shaft 37. An auxiliary guide shaft 38 extending approximately parallel to the main guide shaft 37 is slidingly inserted through a central region of the carriage 31 between the end on which the cutting unit 30 is mounted and the end in which the main guide shaft 37 is inserted. A pair of rotating arms 39 disposed rotatably on the right walls 9 and 10 supports both ends of the auxiliary guide shaft 38.

An output shaft 42 on a solenoid 41 is coupled to one end of the auxiliary guide shaft 38 via an operating link 40. When the solenoid 41 is on (in an excited state), the urging force of a spring (not shown) works to push the lower end of the cutting unit 30 against the upper surface of the cutting head 29. When the solenoid 41 is off (not excited), the output shaft 42 of the solenoid 41 moves upward, forcing, via the operating link 40 and the auxiliary guide shaft 38, the end of the carriage 31 on which the cutting unit 30 is mounted to rotate upward about the fulcrum of the main guide shaft 37. Accordingly, the bottom end of the cutting unit 30 is separated from the top surface of the cutting head 29.

Next, the image forming mechanism 17 will be described. As shown in FIGS. 2 and 3, the image forming mechanism 17 includes a line type thermal head 44 having a length approximately equivalent to the width of the tack sheet 13; and the platen roller 24 disposed in opposition to the thermal head 44 for interposing a tack sheet 13 therebetween.

Since the tack sheet 13 used in the cutting printer 11 described above is composed of both a pressure sensitive adhesive sheet 18 and a mold release sheet 19, the mold release sheet 19 can be quickly peeled away from the pressure sensitive adhesive sheet is in order to stick a tack sheet 13 having been printed with important information into a notebook, onto note paper, or the like. The width of the tack sheet 13 can be set to match the width of a notebook or note paper, such as 70 mm.

Next, the control system of the label producing apparatus 100, including the personal computer 110 serving as the data processing device of the present embodiment and the cutting printer 11, will be described with reference to FIG. 1.

The personal computer 110 includes a main unit 130 and a display 132, as well as a keyboard, a mouse, or the like (not shown). The main unit 130 has a CPU 134, a RAM 136, a hard disk drive 138 and an input/output interface 140. The CPU 134, RAM 136, and hard disk drive 138 are connected to each other and to the input/output interface 140 by a bus. In the present embodiment, the main unit 130 has a drive device (not shown) for reading a program stored on a floppy disk, CD-ROM, or other recording medium. An internal modem or similar device (not shown) is provided in the main unit 130 for connecting to a communication line 139.

The CPU 134 executes prescribed operations based on programs and data read from the hard disk drive 138 and RAM 136, as well as data supplied from the cutting printer 11. The RAM 136 temporarily stores text and image data and results of calculations performed by the CPU 134.

A general-purpose operating system including file management tools and a general-purpose browser program are installed on the hard disk drive 138. The file management tools enable the execution of file processes on files stored in the personal computer 110, such as delete, copy, move, and rename.

The browser program is capable of displaying on the display 132 text data and/or image data stored on the hard disk drive 138, floppy disk, CD-ROM, or other storage medium and text data and/or image data transferred to the personal computer 110 from a WWW server on the Internet via the communication line 139. Here, text data refers to data of character arrays displayed in general by HTML (hypertext markup language), while image data refers to data in the GIF, JPEG. BMP, or like format that is pasted by tags into an HTML document.

Figure 6:
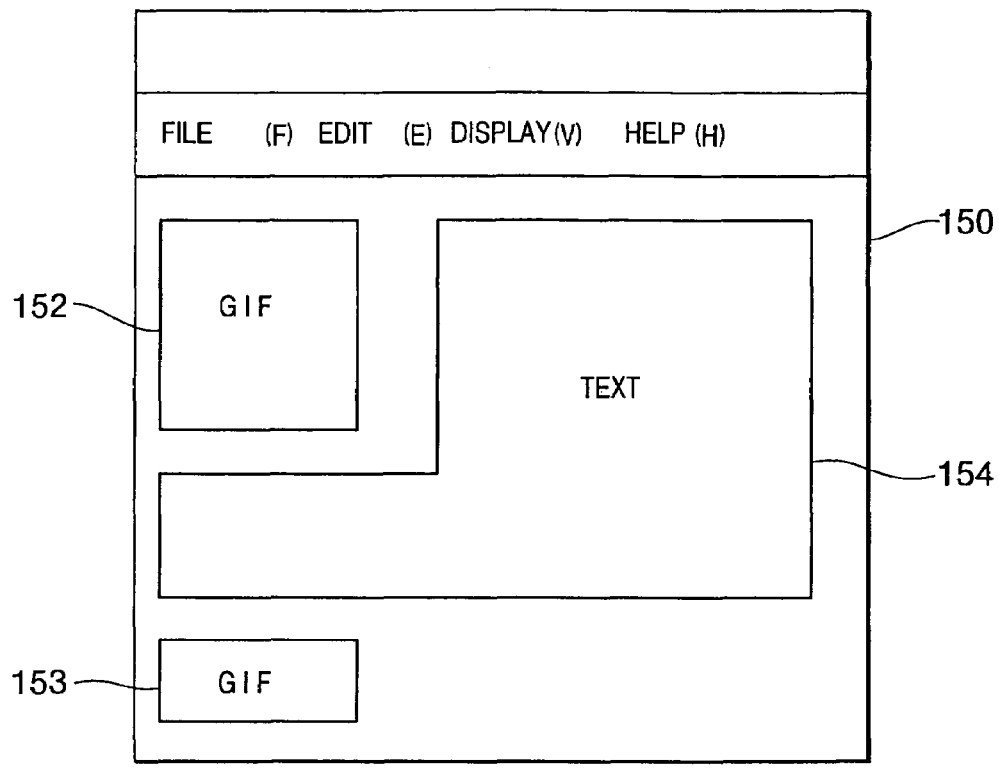
FIG. 6 is an explanatory diagram showing an example display for a browser program on the monitor display of FIG. 1.

FIG. 6 shows an example window of a browser program displayed on the display 132. Here, an HTML document is displayed in a data display area 150 of the browser. GIF images 152 and 153 are pasted in the top and bottom left portions of the data display area 150, respectively. A text portion 154 is displayed in the remaining area.

In addition to the software mentioned above, it is also possible to install an application program on the hard disk drive 138, such as a general-purpose word processing program or a drawing program, that is capable of processing text data and/or image data. For example, one could install a word processing program that is capable of both editing text data stored in a format specific to that software and displaying text data along with image data such as GIF, JPEG, or BMP data.

Further, an editing program (hereinafter referred to as "editor") is installed on the hard disk drive 138 for producing labels with the cutting printer 11. An editor is a program that enables the user to create text data and image data and arrange this data in a desirable layout, and subsequently prints this data onto the tack sheet 13 and cuts the tack sheet 13 at a prescribed position. The user can edit the data by operating the personal computer 110 while viewing images to be printed on the sheet, the cutting position, and the like on the display 132.

There are a variety of ways in which text data and image data can be read into an editor based on the type of operating system and application being used. These methods include having the user draw a rectangular box within the data display area 150 using a mouse; copying and pasting data using a clipboard; and selecting prescribed data using file management tools such as drag-and-drop. When image data displayed on the display 132 is read into the editor, data having the same resolution as that on the display 132 is transmitted to the editor.

The editor functions to automatically edit loaded text and image data based on the types and combinations of data. This is described in more detail later. However, the editor includes such automatic editing functions as a function to identify whether individual loaded data is text or image data; a function to determine whether the identified data is only text data, only image data, or both text and image data; and a function to layout data according to patterns that differ according to the result of the determination.

As part of the data layout function, the editor inserts one line feed code between each data, when the loaded data is text data only, in order to distinguish each of the plurality of text data. The editor also arranges each text data at an address corresponding to the relative position in the prescribed area displayed on the display 132. At this time, each text data is reformatted to make the displayed text easier to read. Text data read from HTML documents in particular often have a line feed code inserted between each displayed line and many indentations. When printed in a format having a different number of characters per line, this can generate line feeds in the middle of lines and lines beginning from irregular positions when space characters fall at the beginning of the line. This makes the document extremely difficult to read. Deleting all of the line feed codes and space characters, however, would only make legibility worse. Therefore, the method of the present embodiment is to delete only those line feed codes and space characters that meet specific conditions according to prescribed rules.

As another part of the data layout function, the editor reduces or enlarges the data when the loaded data is only image data such that the image data fits within a prescribed area, and assigns an address to this image data corresponding to the relative position in the prescribed area. When reducing image data, the resolution of the image can be reduced through a process of thinning dots. When enlarging the image data, a process for interpolating dots can be performed during layout. When there is a plurality of image data, the order of layout for each image data is determined and images having a higher priority can be displayed larger in order that such high priority images can be more easily seen. In another example of the present embodiment, each image data is individually enlarged or reduced and arranged in independent partitioned areas without placing weight on individual image data.

As another part of the data layout function, when the loaded data is a combination of text and image data, the prescribed area for layout is divided into a text area for laying out text data and an image area for laying out image data according to a prescribed occupation ratio. Next, the text and image data are assigned addresses corresponding to relative positions in the text areas and image areas, respectively, as described above. By keeping this occupation ratio variable, it is possible to select an optimal ratio based on the ratio of image data and text data sizes in order to display the data in a well-organized, easy to read manner.

Figure 7:
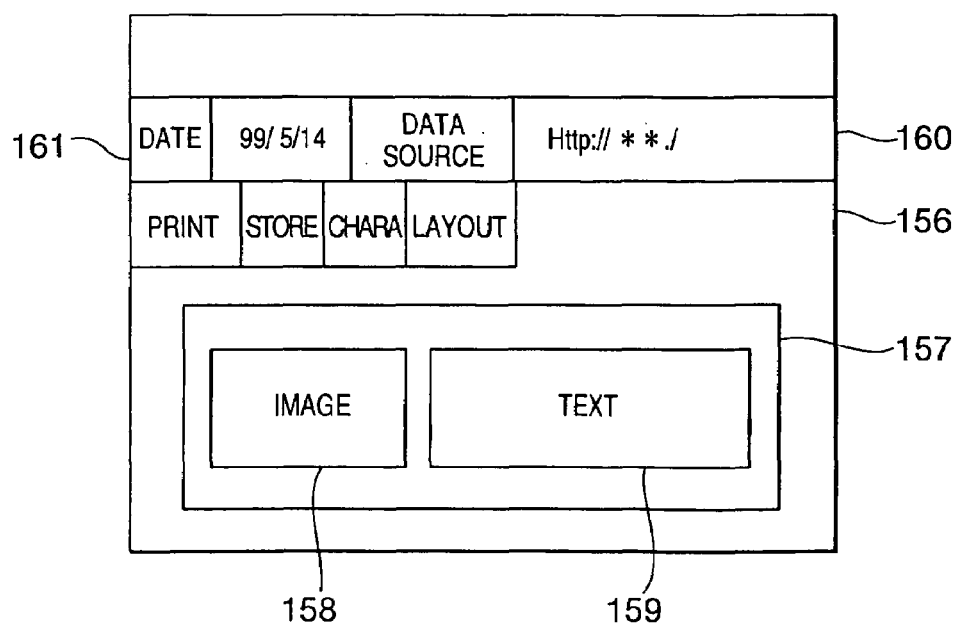
FIG. 7 is an explanatory diagram showing an example display for an editor after reading both text and image data.

FIG. 7 shows an example display on the display 132 when the editor has read both text and image data. A data display area 156 of the editor includes a print area 157 having a width equal to that of the tack sheet 13 (enlarged or reduced to fit on the display 132). The print area 157 is divided into the image area 158 and a text area 159, excluding the margin space. One or more image data arranged according to a prescribed pattern is displayed in the image area 158, while one or more text data arranged according to a prescribed pattern is displayed in the text area 159 based on user specified fonts, character sizes, and character and line spacing. It is possible to display text data in HTML documents and the like using the same character fonts, colors, and sizes specified in the documents.

The print area 157 is enlarged or reduced according to an enlargement/reduction ratio prescribed for the tack sheet 13 and displayed in the display 132, enabling the user to modify this enlargement/reduction ratio as desired. The image area 158 and text area 159 are also enlarged or reduced by the same ratio used for the print area 157. The scope of the print area 157 displayed on the display 132 is stored in a prescribed area of the RAM 136 as a portion of print data, with the upper left corner of the print area 157 assigned the top address, that is, the point of origin. Addresses for each of the image and text data arranged in the image area 158 and text area 159 are also stored in prescribed areas of the RAM 136 as a part of the print data.

A form feed process to begin a new page is automatically performed whenever the length of the print area 157 reaches approximately 100 mm. If this form feed process were not performed when the size of text data and the like displayed in the print area 157 becomes too large, the tack sheet 13 would not be cut, thereby forming a long sheet of tack sheet 13 that is not convenient for pasting into notebooks and the like. Therefore, the present invention automatically performs a form feed at each length of approximately 100 mm and lays out the subsequent data in the print area 157 for the next page. As a result, the tack sheet 13 is cut after printing approximately 100 mm. It is also possible for the user to select a desirable position for the form feed. The address of the form feed position is also stored as a part of print data in a prescribed area of the RAM 136.

In addition to form feed positions, the editor also issues commands to cut the tack sheet 13 when printing of all text and images is complete. This process can prevent wasteful use of the tack sheet 13 by eliminating unused margins at the bottom of the printing area when less than a page full of data is printed or when a small area of print data continues onto the next page after a form feed. This process also eliminates the need for the user to out the tack sheet 13 discharged from the cutting printer 11. The address of the cutting position is also stored as a part of print data in a prescribed area of the RAN 136.

An appended data display area 160 is provided at the top of the data display area 156 for displaying the date and URL of the data source for the current print data. A command display area 161 is provided beneath the appended data display area 160 for displaying a menu of such commands as Print, Save, Character, and Layout, enabling the user to select and execute one of these commands. While viewing the layout of text and images displayed in the data display area 156, the user can modify the layout when necessary by performing such editing operations as inserting or deleting character arrays. Editing operations are easy to perform with this configuration because the text and images displayed in the print area 157 are in a WYSIWYG (what you see is what you get) format. When the user selects the Print command in the command display area 161, print data edited with the editor, including image data, text data, and their corresponding address data, as well as the above-described print scope data, feed form position data, and sheet cutting position data, are transmitted to the RAM 118 of the cutting printer 11. Then, the tack sheet 13 is printed and cut based on commands issued from the CPU 114.

The cutting printer 11 includes an input/output interface 112. The input/output interface 112 is connected to the input/output interface 140 of the personal computer 110. Within the cutting printer 11, the input/output interface 112 is also connected to a CPU 114, a ROM 116, a RAM 118, a head drive circuit 120 for driving a thermal head 44 (refer to FIGS. 2 and 3), motor drive circuits 122 and 124 for driving a first drive motor 21 and a second drive motor 35 (refer to FIG. 3), respectively, and a solenoid drive circuit 126 for driving a solenoid 41 (refer to FIG. 4).

The ROM 116 stores programs and data required for controlling operations of the cutting printer 11. The CPU 114 performs prescribed operations according to programs and data read from the ROM 116 and data supplied from the personal computer 110 and issues control signals to the head drive circuit 120 and the like. The RAM 118 temporarily stores data supplied from the personal computer 110, results of calculations by the CPU 114, and other data.

Next the process of creating labels using a label producing apparatus 100 with the construction described above will be described in detail with reference to FIGS. 8–27. Here, the label producing apparatus 100, which includes the personal computer 110 and cutting printer 11, is the data processing device of the present embodiment.

Figure 8:
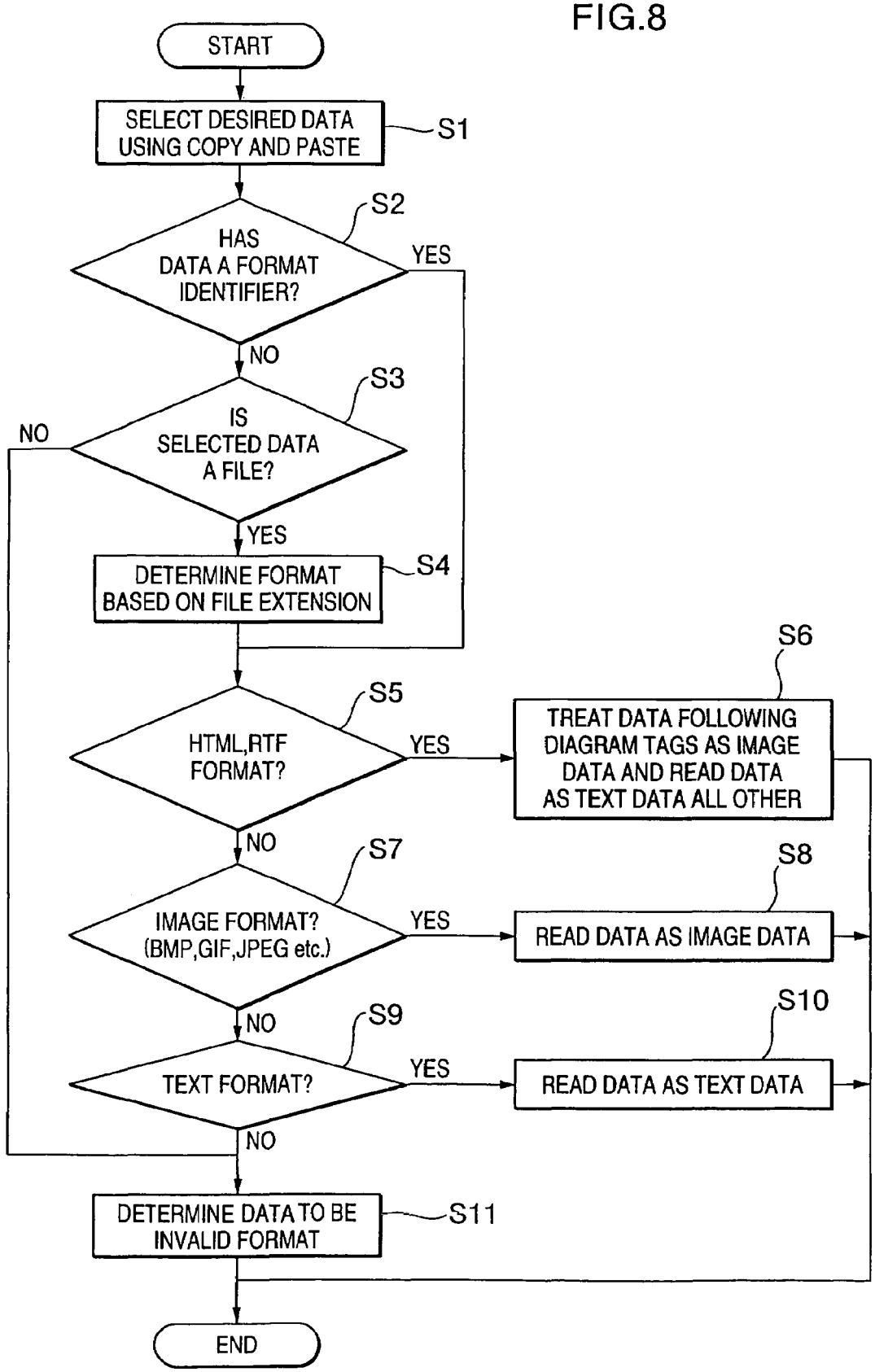
FIG. 8 is a flowchart of a process for identifying text and image data.

First, a process for identifying text and image data will be described with reference to FIG. 8. In Step S1, the user operates the personal computer 110 to start at least one of the browser and word processing programs and to display text and/or image data in the display 132. Also in Step S1, the user selects desired data displayed in the display 132 using the copy and paste functions or another method in the browser or word processing program. Instead of using the browser program or the like, the user can select data to process by performing the drag-and-drop method on a file using the file operating tools. After selecting data or a file in this way, the user starts the editor by performing prescribed startup operations.

In Step S2, it is determined whether the selected data includes a format identifier. A format identifier is text data written in the top portion of the data indicating the type of data, such as HTML. TXT, GIF, or BMP. When data is selected using copy and paste from the browser or word processing program, the browser or other application program in which the data was displayed writes the format identifier. If the data includes a format identifier (Yes in S2), then the process jumps to Step S5. If there is no identifier (No in S2), then the process continues from Step S3. Cases in which there is no format identifier may occur when a file is selected by drag-and-drop in the file operating tools and the editor cannot directly reference the contents of the file.

In Step S3, it is determined whether the selected data is a file. If the data is a file (Yes in S3), then the process continues from Step S4. If not (No in S3), then the process jumps to Step S11. Cases in which the data is not a file include, for example, simple URLs and simple folder names. In Step S4, the format of the data is determined based on the file extension. The extension is the letters following a period in the filename that indicate the type of the file.

In Step S5, it is determined whether the data format is HTML or RTF. More specifically, the CPU 134 analyzes the format identifier in the top portion of the data or the file extension. If the format is either HTML or RTF (rich text format) (Yes in S5), then the process continues from Step S6. If the format is not HTML or RTF (No in S5), the process jumps to Step S7. In Step S6, data following diagram tags in the HTML or RTF document is treated as image data and all other data is read as text data. Data that indicates these data types (whether the data is image or text data) is linked to addresses at which the individual image and text data are stored and stored in a prescribed area of the RAM 136 as individual data identifying data.

In Step S7, the CPU 134 determines whether the data format is an image format such as BMP. GIF, or JPEG, similar to the process of Step S5. If the data is in an image format (Yes in S7), then the process continues from Step S8. If the data is not an image format (No in S7), then the process jumps to Step S9. In Step S8, the data is read as image data. Also, as in Step S6, data that indicates this data is image data is linked to addresses at which the individual image data is stored and is stored in a prescribed area of the RAM 136 as individual data identifying data.

In Step S9, the CPU 134 determines whether the data format is a text format, similar to the process of Step S5. If the data is in a text format (Yes in S9), then the process continues from Step S10. If the data is not in a text format (No in S9), then the process jumps to Step S11. In Step 610, the data is read as text data. Also, as in Step S6, data that indicates this data is text data is linked to addresses at which the individual text data is stored and is stored in a prescribed area of the RAM 136 as individual data identifying data.

In Step S11, the data is determined to be an invalid format either because the data format is not HTML, RTF, an image format, or a text format or because the data is not a file and does not include a format identifier, and the process of reading the selected data is canceled. At this time, an operation for notifying the user is performed. For example, a message is displayed in the display 132 informing the user that the data format is invalid or that the data read has been canceled.

By conducting the steps described above repeatedly for each individual data read by the editor, it is possible to identify whether individual data is text or image data. When the editor also handles data created by a word processing program, the CPU 134 should also determine in Step S5 whether the data is of the format created by that word processing program. For example, if we call the format produced by the word processing program "ABC format," then the CPU should determined whether the data, format is ABC, HTML, or RTF.

Now, by reading individual data identifying data stored in the RAM 136 into the CPU 134, it is possible to determine whether data read into the editor is only text data, only image data, or both text and image data. The results of these determinations are stored as combination determining data in a prescribed area of the RAM 136. When the data format is determined to be either HTML or RTF in Step S5 of FIG. 8 and the document contains diagram tags, then this data can be considered to contain both text and image data.

Next, a method for processing text data with the editor when data read by the editor is determined to be only text data by the above process will be described. When the combination determining data indicates that data read by the editor is only text data, the text is arranged in the address area corresponding to the area of the print area 157 shown in FIG. 7, excluding the margins. Here, the first text data is reformatted as described below and assigned to the top address of the print area 157. This address is written to a prescribed area of the RAM 136 and the first text data is displayed in the print area 157. Subsequently, a line feed code is inserted to move to the next line. Next, the second text data is reformatted and assigned to the next address. The address is written to a prescribed area of the RAM 136 and the second text data is displayed in the print area 157. This procedure is repeated until the last text data has been processed. During this process, a control process is performed to write line feed position data and sheet cutting position data to memory in order that the tack sheet 13 is cut each time the length of the print area 157 exceeds a prescribed length and also directly after the final text data has been printed. Below this process will be described in more detail with reference to FIGS. 9–13.

Figure 9:
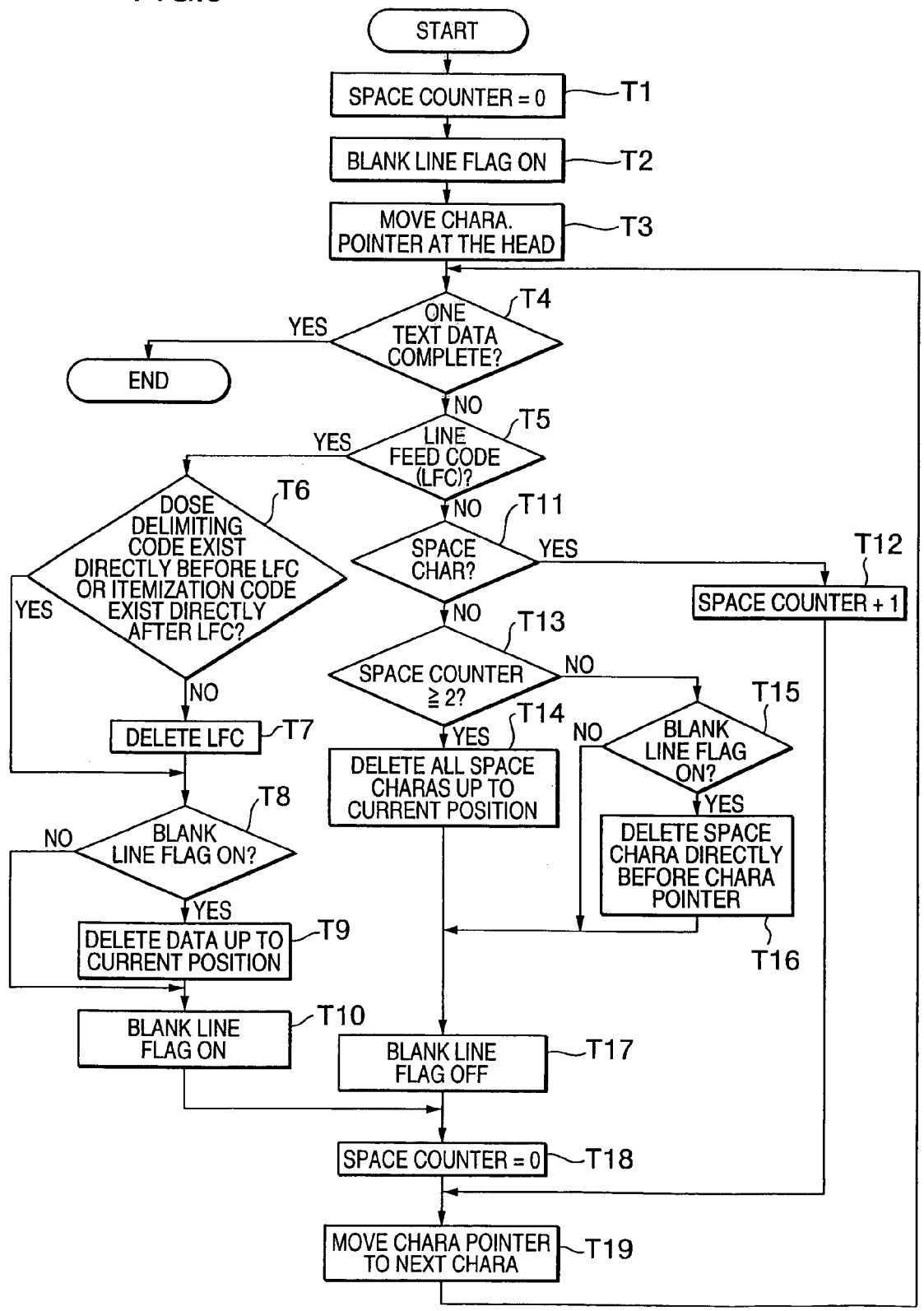
FIG. 9 is a flowchart of a process for reformatting text data.

First, the process of reformatting text data will be described with reference to FIG. 9. In Step T1, a space counter stored in a prescribed area of the RAM 136 is initialized to 0. In Step T2, a blank line flag stored in a prescribed area of the RAM 136 is set to on. In Step T3, a character pointer stored in a prescribed area of the RAM 136 is moved to the character code at the head of the text data. Here, the space counter represents the number of space characters (spaces, tab codes, and the like) that exist consecutively in the text data. The blank line flag represents whether a character other than the space character exists in one logical line.

In Step T4, it is determined whether the process of reformatting one text data is completed, the ideas, whether the position of the character pointer exceeds the position of the final character in the text data. If the character pointer exceeds the final character position (Yes in T4), then the text data has been reformatted and the process ends. If not (No in T4), the process continues to Step T5.

In Step T5, it is determined whether the character code pointed to by the character pointer is a line feed code. If the character pointer points to a line feed code (Yes in T5), the process continues to Step T6. If the character code is not a line feed code (No in T5), then the process jumps to Step T11.

In Step T6, it is determined whether the character directly before the line feed code is a punctuation mark or other delimiting code, such as a ".", ",", ":", ";", and the like, or whether the character directly after the line feed code (even when the character follows the line feed code after 1–3 space characters) is an itemization code normally used at the head of each line in an itemization, such as a ".", "1.", "(1)", "①", "A.", or the like. If either of the conditions described above are met (Yes in T6), the process continues to Step T8. If the conditions are not met (No in T6), the process continues to Step T7 and the line feed code is deleted.

Line feed codes following directly after punctuation marks and the like are not deleted in Step T6 because deleting them would remove paragraph divisions and allow text in the document to continue without interruption for a long time. This would be difficult to read. Further, line feed codes followed directly by itemization symbols are also not deleted because displaying an entire itemized passage on the same line without line feeds would destroy the clarity intended by the itemization.

In Step T8, it is determined whether the blank line flag is on. If the blank line flag is on (Yes in T8), then the process continues to Step T9. If the blank line flag is set to off (No in T5), then the process jumps to Step T10. The blank line flag being set to on in Step T8 indicates that no character other than the space character exists in that logical line, that is, all characters up to the line feed code in the present logical line are space characters. Therefore, in Step T9, all space characters in the current logical line, that is, all space characters from the position just after the previous line feed code or from the start of the document up to the current position, are deleted. Next, in Step T10, the blank line flag is set to on and the process jumps to Step T18.

In Step T11 it is determined whether the character code currently pointed to by the character pointer is a space character. If the character code is a space character (Yes in T11), then the process continues to Step T12. If the character code is not a space character (No in T11), then the process jumps to Step T13. In Step T12, the space counter is incremented 1 and the process jumps to Step T19.

In Step T13, it is determined whether the value of the space counter is greater than or equal to 2. Here, the count value is set to 2 or greater because removing all single space characters, commonly inserted between words in most European languages, would make it difficult for the user to decipher the text. If the value of the space counter is greater than or equal to 2 (Yes in T13), then the process continues to Step T14. If the value of the space counter is less than 2 (No in T13), then the process jumps to Step T15.

In Step T14, all space characters up to the current position are deleted since it is determined by the value of the space counter being 2 or greater that more spaces (such as indentations and the like) than necessary were inserted into the original text data. Subsequently, the process continues to Step T17.

In Step T15, it is determined whether the blank line flag is set to on. If the blank line flag is on (Yes in T15), then the process continues to Step T16. If the blank line flag is off (No in T15), then the process jumps to step T17. Cases in which the blank line flag is set to on include that in which the character pointer is at the head of the line and that in which the character pointer is at the second character from the head of the line and the first character is a space character. Therefore, in Step T16, the space character directly before the character pointer is deleted. In this way, space characters at the beginning of lines are deleted while preserving space characters intentionally inserted between words and the like in documents written in European languages, for example. This method has the effect of lining up the start of each line to create a sense of evenness to the text and make it more legible.

In Step T17, the blank line flag is set to off. In Step T18, the space counter is initialized to 0. In Step T19, the character pointer is moved to the next character code. Here, the process returns to Step T4 and the above steps are repeated.

Next, an example of how text data is reformatted according to the present embodiment will be described with reference to FIGS. 11–13. Note that downward pointing arrows (↓) in these drawings represent line feed codes and are not actually printed.

Figures 11, 12:
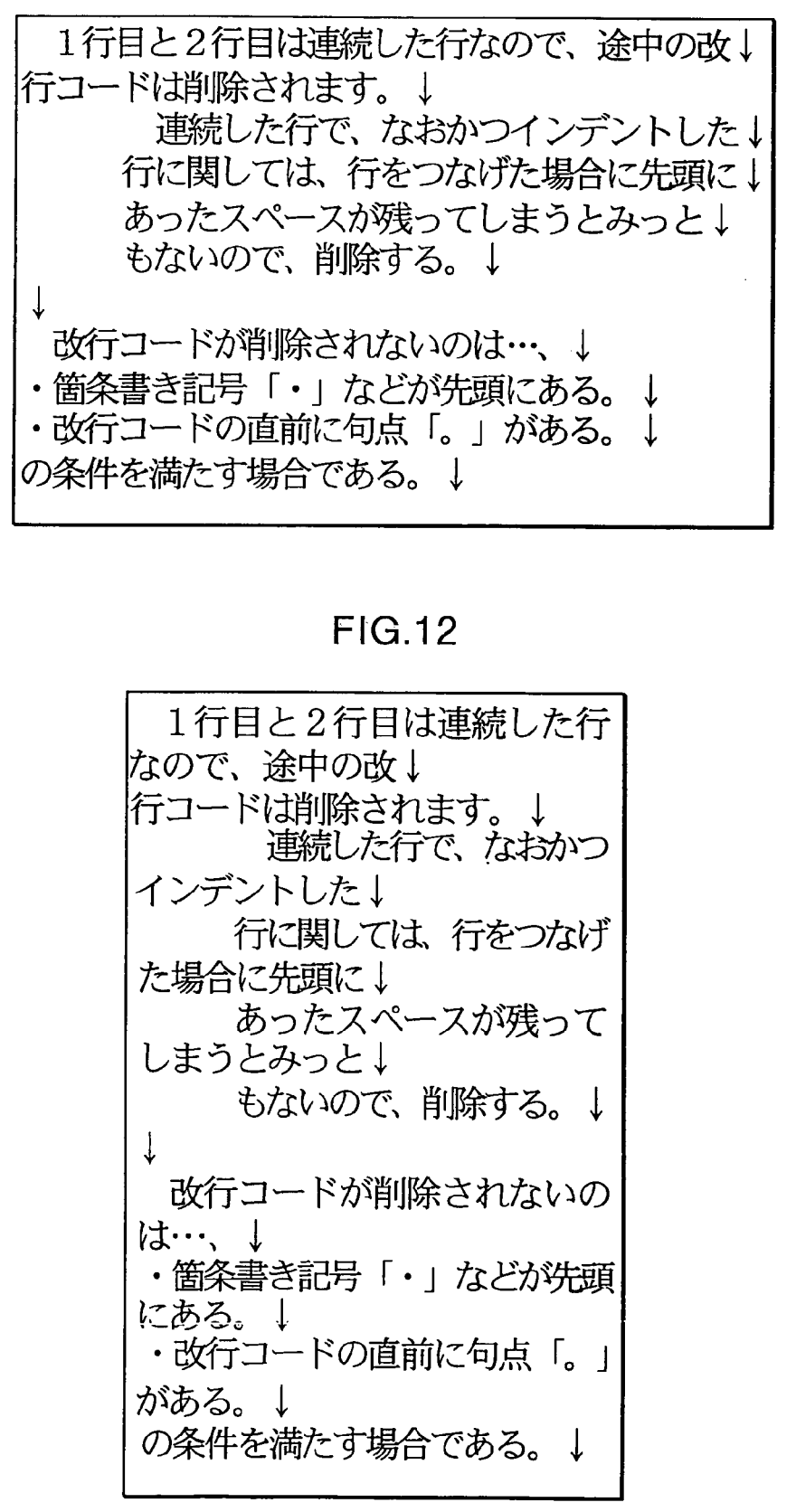

FIG. 11 shows the original text data as it appears in the browser, having a line feed code added to the end of each line. Lines 3–6 have been indented and line 7 contains only a line feed code. FIG. 12 shows the same text data as it is displayed in a text area having fewer characters per line than that of FIG. 11. In the text data shown in FIG. 12, line feeds occur in the middle of lines at inconvenient places, and spaces remain in the indented lines, making it very difficult to read.

FIG. 13 shows the text data after being processed according to the method of the present embodiment. As can be seen in FIG. 13, the space at the head of the first line is deleted after performing Steps T4–T11, returning to T4 via T12, and finally performing Steps T13, T15, and T16. The spaces at the head of each indented line 3–6 are deleted after performing Steps T4–T11, returning to T4 via T12 and T19 and repeating as often as there are spaces, and finally performing Steps T11, T13, and T14. The line feed codes at the ends of lines 3–5 and line 7 are also deleted in Steps T4–T7. However, the line feed codes at the ends of lines 2, 6, and 8–11 are left in place since only Steps T4–T6 and not Step T7 are executed.

Hence, when the print area has less characters per line than the original shown in FIG. 11, the method of the present embodiment prevents line feeds from occurring in the middle of lines, except for specific cases, and does not leave spaces in indented lines. Further, lines with itemization symbols such as the "." symbol are preserved in the same itemized format without deleting their line feed codes. Line feed codes occurring directly after the "." punctuation mark are also not deleted in order to clearly distinguish each line. Single spaces existing at the beginning of lines are deleted to keep the beginning of each line flush with one another. The line feed code in the seventh line of FIG. 11 is deleted to keeps the text compact. Hence, the method of the present embodiment can display text data in a compact, well-organized manner without requiring complex processes, even when the number of characters per line is changed. As a result, text printed on an area as narrow as the tack sheet 13 is still easy to read.

Figure 10:
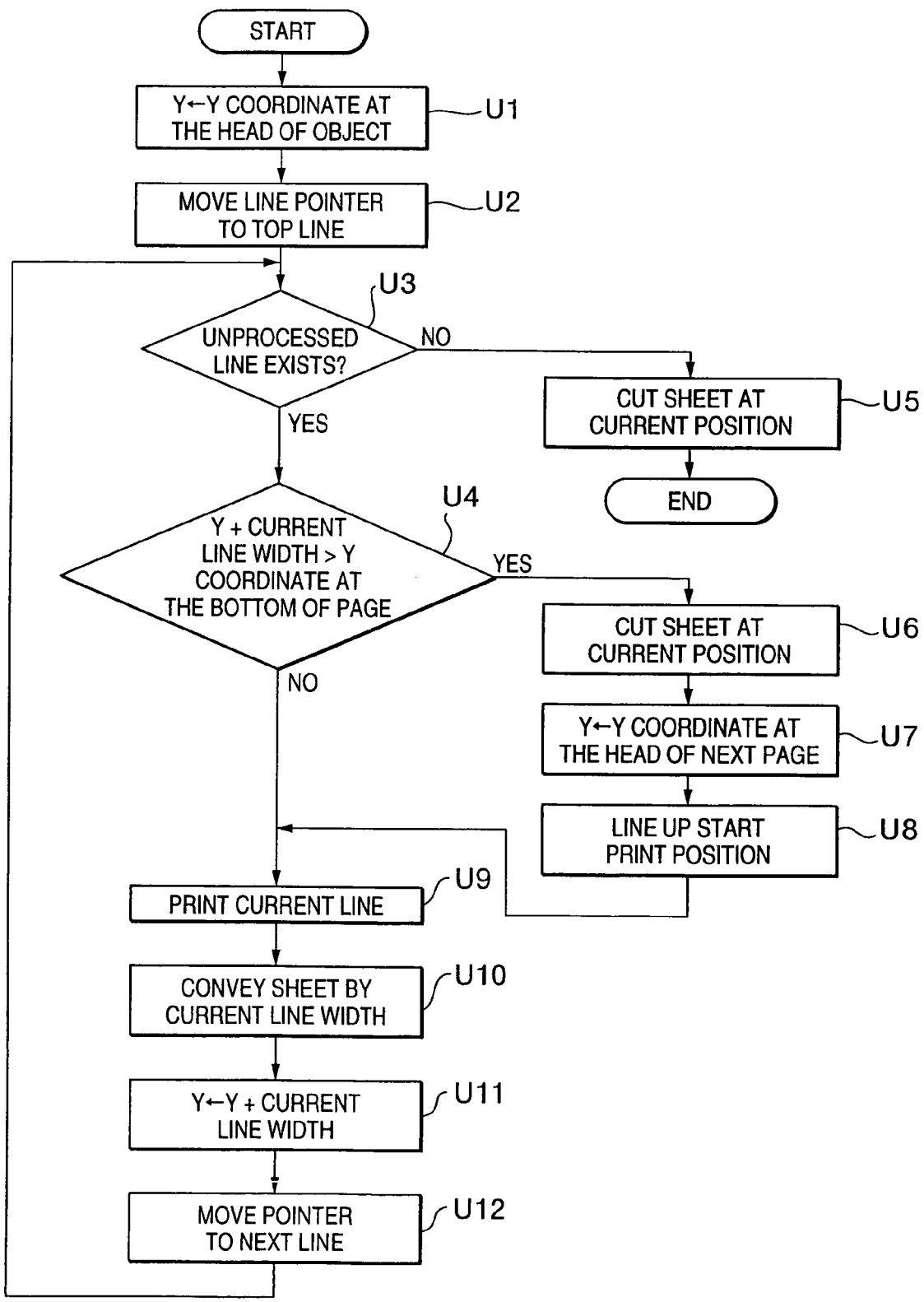
FIG. 10 is a flowchart of a form feed and tack sheet cutting process for text data.

Next, a form feed and sheet cutting process for the tack sheet 13 when arranging only text data will be described with reference to FIG. 10. The example described herein refers to printing one text data having a large size that extends over a plurality of pages. However, the same process is performed when printing a plurality of text data, excluding the case in which one line with only a line feed code is provided between each text data.

In Step U1, a variable Y is set to the Y coordinate at the head of the object (the lengthwise coordinate for the start print position on the first page of the tack sheet 13). In Step U2, a line pointer stored in a prescribed area of the RAM 136 is moved to the top line.

In Step U3, it is determined whether an unprocessed line exists, that is, whether the position of the line pointer exceeds the position of the final line of text data. If the line pointer exceeds the final line of text data (No in U3), then the process jumps to Step U5. In Step U5, the current position is written as a cutting position to a prescribed area of the RAM 136 in order that the tack sheet 13 is cut at the current position. However, if the line pointer does not exceed the final line of text data (Yes in U3), then the process continues from Step U4.

In Step U4, it is determined whether the sum of the current line width and the variable Y exceeds the Y coordinate at the bottom of the page (the final print position in the lengthwise direction for each page of the tack sheet 13). If this sum exceeds the Y coordinate at the end of the page (No in U4), then the process jumps to Step U9. If not (Yes in U4), then the process jumps to Step U6. In U6, the current position is written as a cutting position to a prescribed area of the RAM 136 in order that the tack sheet 13 is cut at the current position. In Step U7, the variable Y is set to the Y coordinate at the head of the next page (the start print position). In Step U5, data for conveying the tack sheet 13 in order to line up the start print position is written to a prescribed area of the RAM 136, and the process continues to Step U9.

In Step U9, text data for the current line pointed to by the line pointer is written to a prescribed area of the RAM 136 in order to print that text data on the tack sheet 13. In Step U10, data for conveying the tack sheet 13 to advance exactly the width of the current line is written to a prescribed area of the RAM 136 in order to print the next line.

In Step U11, the variable Y is set to the sum of itself and the width of the current line. In Step U12, the line pointer is moved to the nest line, and the process returns to Step U3.

With the process described above, it is possible to create labels that can be easily pasted into a notebook or the like by cutting the tack sheet 13 to prescribed lengths when the text data extends over a plurality of pages. If the text data is less than the length of one page, then the tack sheet 13 is cut at a position just after the end of the text data. Accordingly, it is possible to create printed labels of a compact size and without wasteful margins at the bottom of the sheet, thereby helping to reduce costs. This process also eliminates the bothersome need for the user to cut such marginal areas of labels discharged from the cutting printer 11.

Next the process of reformatting image data with the editor will be described for the case when data read by the editor is determined to be only image data according to the process described in FIG. 8. When the combination determining data indicates that data read by the editor is only image data, the image data is arranged in the address area corresponding to the area of the print area 157 shown in FIG. 7, excluding the margins.

A first example for processing only image data will be described with reference to FIGS. 14 and 15. In this example, each of the plurality of selected image data is assigned a priority and images are arranged in the address area corresponding to the first page of the tack sheet 13 in order, beginning from images with the highest priority.

Figure 15:
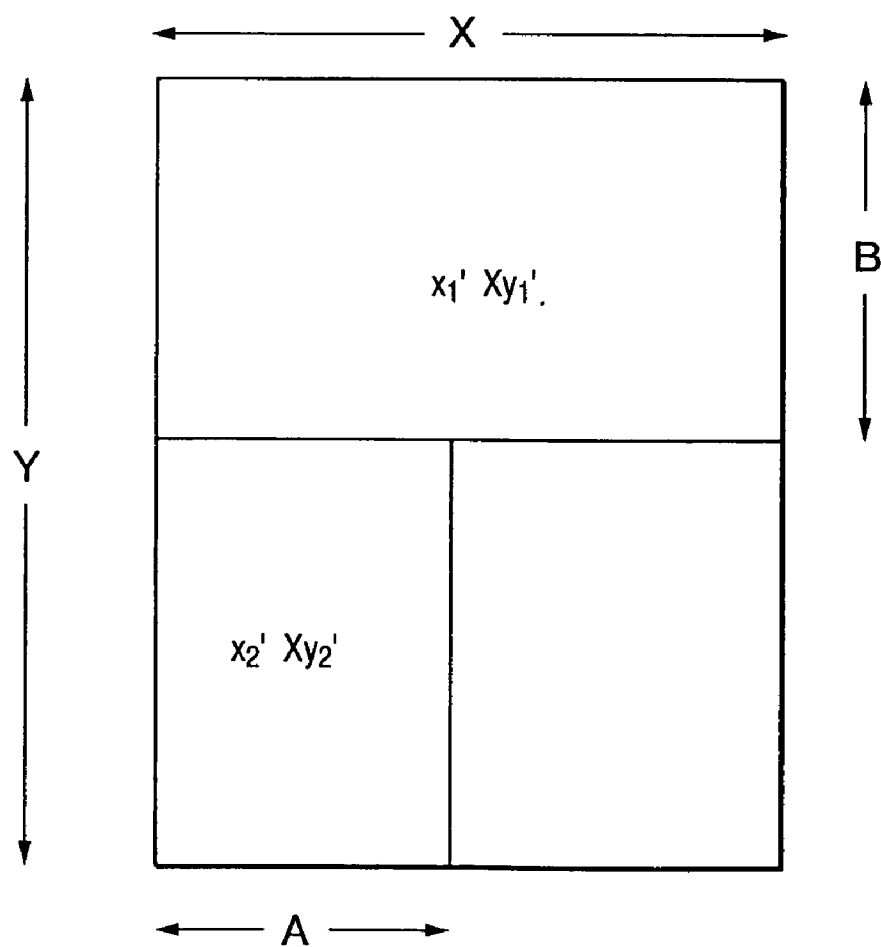
FIG. 15 is a conceptual diagram showing the print image of an example image data layout according to the process of FIG. 14.

In the present example, n selected image data of a rectangular shape are arranged in the address area corresponding to the rectangular print area on one page of a tack sheet 13, as shown in FIG. 15. The priority for arranging these n image data in this example is set according to size (number of bytes) from largest to smallest. In other words, the CPU 134 determines the order of priority by comparing the size of each image data. This order is written to a prescribed area of the RAM 136. When arranging the image data, images having the largest size are laid out first according to the order in which they are written in the RAM 136. With this method, large image data can be displayed and printed at a large size. Alternatively, the order of priority for arranging image data can be set according to the order in which the image data was selected or can be determined arbitrarily by the user. Regardless the method used, the CPU 134 sets this order of priority and writes the same to a prescribed area of the RAM 136.

Based on the order written to the RAM 136, each original image data is proportionally enlarged or proportionally reduced to form a proportional image data. This proportional image data is arranged inside the address area corresponding to an unoccupied portion of the print area. At this time, each image data is proportionally enlarged or reduced to the maximum size that can fit within the unoccupied layout area. Further, each image data is laid out in the same direction. Accordingly, a plurality of images printed on one tack sheet can be viewed at a glance without requiring the user to change the viewing angle for each image.

As shown in FIG. 15, X is set to the length (number of dots) corresponding to the width of the print area on the tack sheet, while Y is set to the length corresponding to the length of one page of the tack sheet 13. An n number of image data are proportionally enlarged or reduced and laid out in the address area corresponding to this print area (X, Y). Let us say that the original size of the nth image data as displayed in the browser is (xn, yn) and the size of the proportional image data in the editor window after the same data has been proportionally enlarged or reduced is (xn', yn'). By setting the top left point in the image area to the reference point, we can set B as the distance of the image in the Y direction when the proportional image data occupies the entire width X, and A as the distance of the image in the X direction when the proportional image data occupies the entire length Y.

Figure 14:
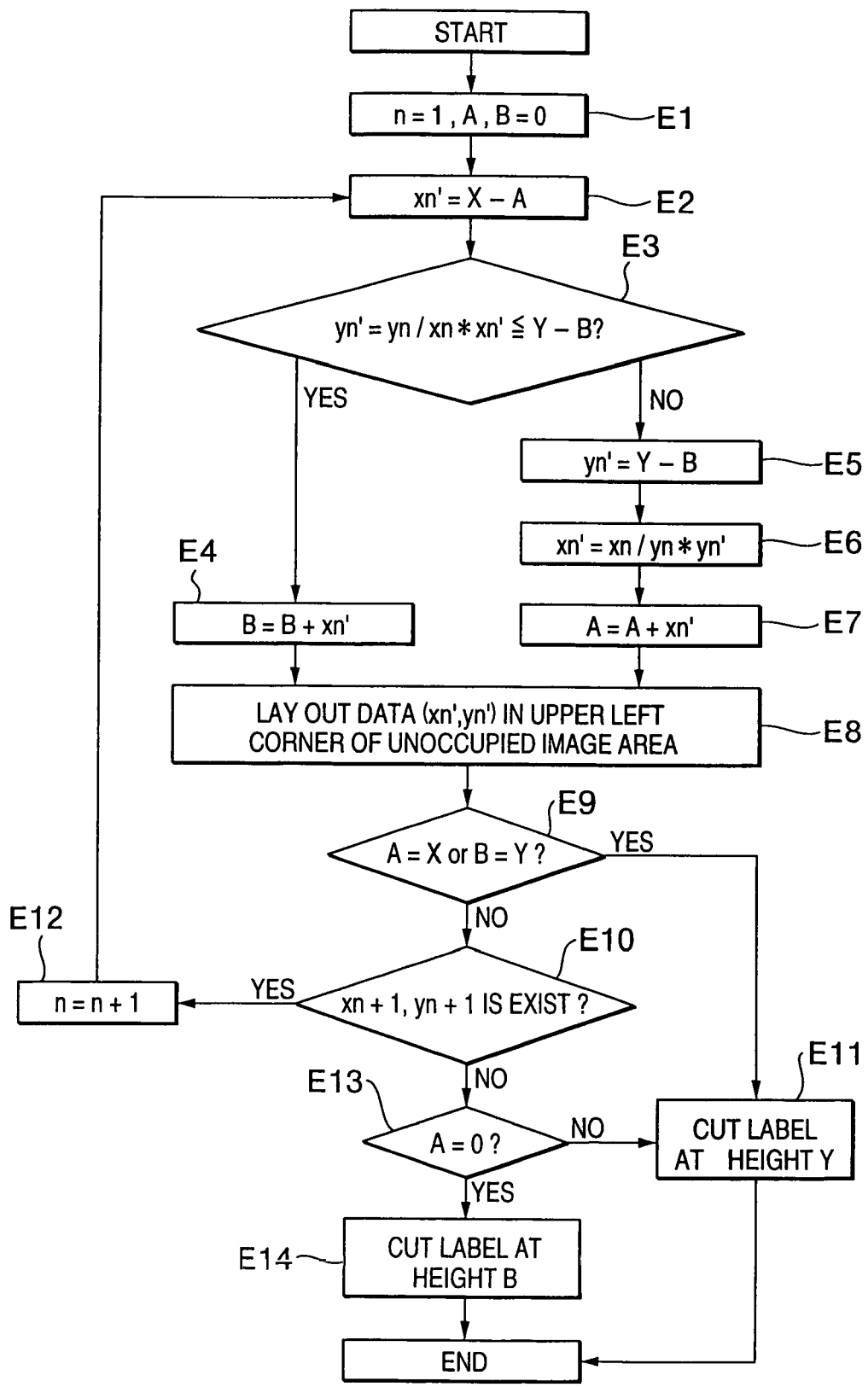
FIG. 14 is a flowchart of a first example layout process for image data.

In Step E1 of FIG. 14, the parameter n is set to 1 and the above variables A and B are set to 0. In Step E2, the width xn' of the proportional image data obtained by enlarging or reducing the nth image data having a width xn is set to X-A and stored in memory.

In Step E3, the length yn' of this enlarged or reduced image data is found based on the width xn' determined in Step E2 (yn'=(yn/xn)*xn'), and this length yn' is compared to the difference Y-B. If yn'≦Y-B (Yes in E3), then the process continues to Step E4. If yn'>Y-B (No in E3), then the process jumps to Step E5.

If yn'≦Y-B, this signifies that the enlarged or reduced length y1' for the first image data can fit within the length Y of the print area on one page when the enlarged or reduced width x1' for the same data is set to the entire width X of the print area. In this case, the proportional image data (xn', yn') determined in Steps E2 and E3 is arranged in the unoccupied image area. Then, in Step E4, the variable B is set to B+yn' and stored in memory.

On the other hand, if yn'>Y-B, this signifies that the enlarged or reduced length y1' for the first image data cannot fit within the length Y of the print area on one page when the enlarged or reduced width x1' for the same data is set to the entire width X of the print area. In this case, the Y direction is used in place of the X direction as the reference for proportionally altering the image size. Accordingly, in Step E5, the length yn' of the enlarged or reduced image data is set to Y-B and stored in memory.

In Step E6, the width xn' of this enlarged or reduced image data is found based on the length yn' determined in Step E5 (xn'=(xn/yn)*yn'). In Step 17, the variable A is set to A+xn' and stored in memory.

In Step E8, the proportional image data (xn', yn') determined in Steps E2 and E3 or in Steps E5 and E6 is laid out in the address area corresponding to the unoccupied image area beginning from the top address, that is, the upper left corner. At this time, the percentage of enlargement or reduction from the original image data along with addresses indicating the layout position range of the proportional image data are associated with the addresses of the original image data and written as part of the print data to a prescribed area of the RAM 136.

In Step E9, it is determined whether the variable A is equal to X (A=X) or the variable B is equal to Y (B=Y). If one of these two conditions is met (Yes in E9), then this indicates that the print area on one page is filled with image data, and the process jumps to Step E11. In Step E11, a cutting position for cutting the tack sheet 13 in the widthwise direction at the length Y is written as part of the print data to a prescribed area in the RAM 136.

However, if neither of the above two conditions is met (No in E9), then this indicates that the print area for one page still has some blank space and the process continues to Step E10. In Step E10, is determined whether there is another image data. If another image data exists (Yes in R10), then in Step E12 the parameter n is incremented by 1 and the process returns to Step E2. If no image data remains (No in E10), then the process continues to Step E13.

In Step E13, it is determined whether the variable A is 0. If the variable A equal 0 (Yes in E13), then this indicates that the bottom portion of the print area on the page includes an area with no printing and the process continues to Step E14. In Step E14, a cutting position for cutting the tack sheet 13 in the widthwise direction at a position B is written as a part of the print data to a prescribed area of the RAM 136. However, if the variable A is not 0 (No in E13), then this indicates that the current page will be printed across the entire length Y of the print area. Therefore, the process jumps to Step E11, in which a cutting position for cutting the tack sheet 13 in the widthwise direction at the length Y is written as part of the print data to a prescribed area of the RAM 136.

With this process, it is possible to arrange one or a plurality of image data in address areas corresponding to the printing areas by enlarging or reducing the images and to achieve a compact and well-organized display in the editor without requiring complex editing processes.

Next, a second example of a layout process when only image data is read will be described with reference to FIGS. 16 and 17. In this example, image data is laid out according to a method similar to that described in the first example. However, one page of the tack sheet 13 is treated as an area elongated in the horizontal direction rather than in the vertical direction, as in the first example. Therefore, in the first example image data that is longer in the vertical direction can be displayed relatively large in the layout, while image data longer in the horizontal direction is displayed relatively smaller. In contrast, in the second example image data longer in the horizontal direction is displayed relatively larger.

Figure 17:
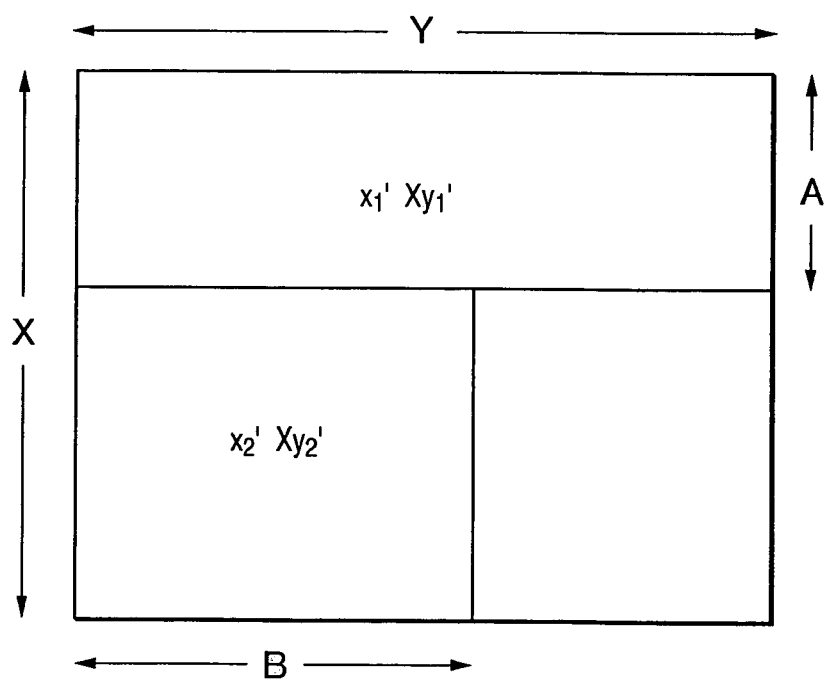
FIG. 17 is a conceptual diagram showing the print image of an example image data layout according to the process of FIG. 16.
Figure 18:
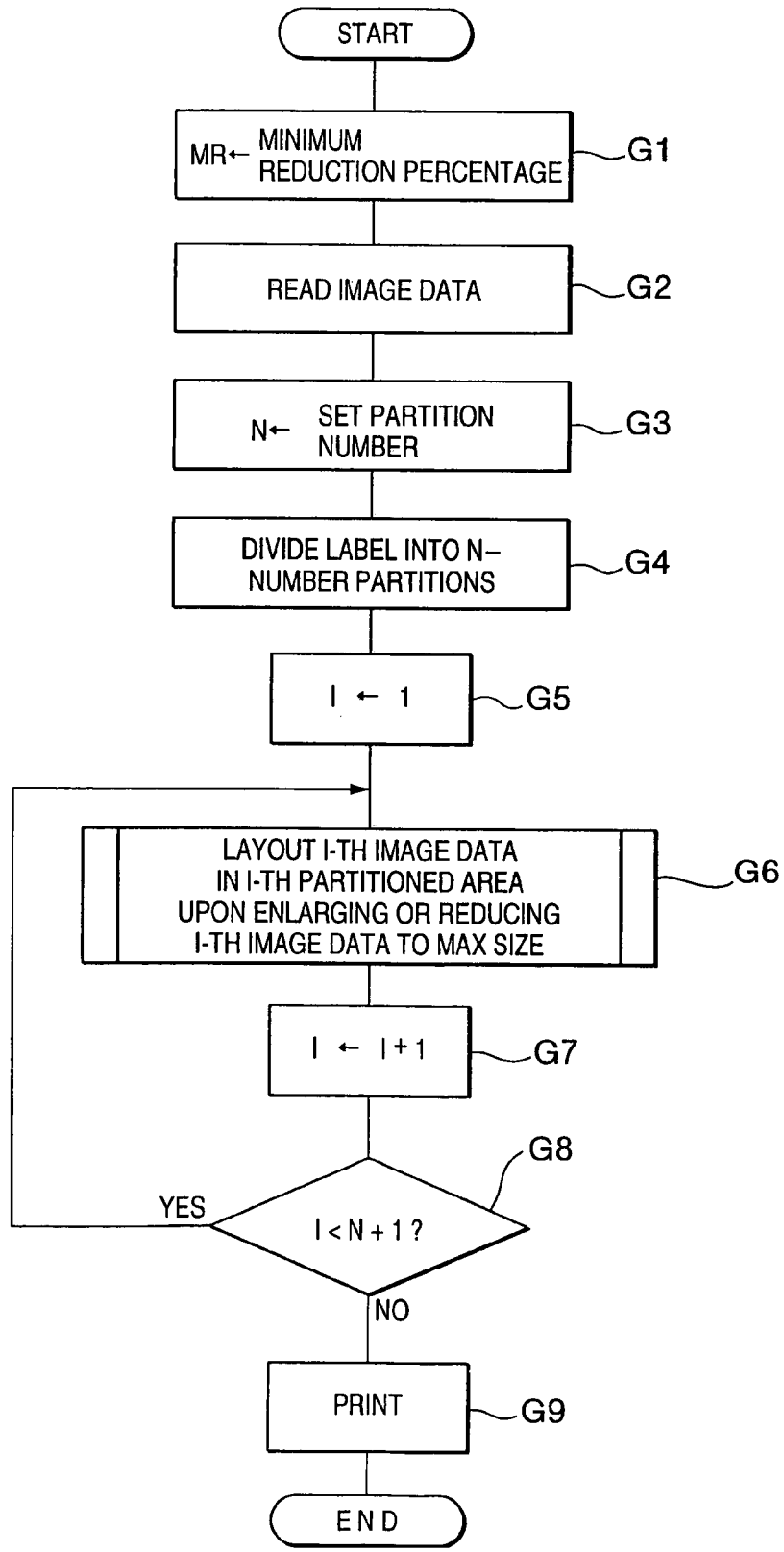
FIG. 18 is a flowchart of a third example layout process for image data.

As shown in FIG. 17, n selected image data of a rectangular shape are arranged in the address area corresponding to the rectangular print area on one page of a tack sheet 13. Here, the tack sheet 13 is rotated 90 degrees from that shown in FIG. 15 in order that the length Y side corresponding to the length of one page of the tack sheet 13 in FIG. 15 is rotated to the top side of the image. The priority for arranging these n image data in this example is set according to size or the like and written to a prescribed area of the RAM 136. Based on the order written to the RAM 136, proportional image data is arranged at a maximum size and in a common layout direction inside the address area corresponding to an unoccupied portion of the print area.

Figure 16:
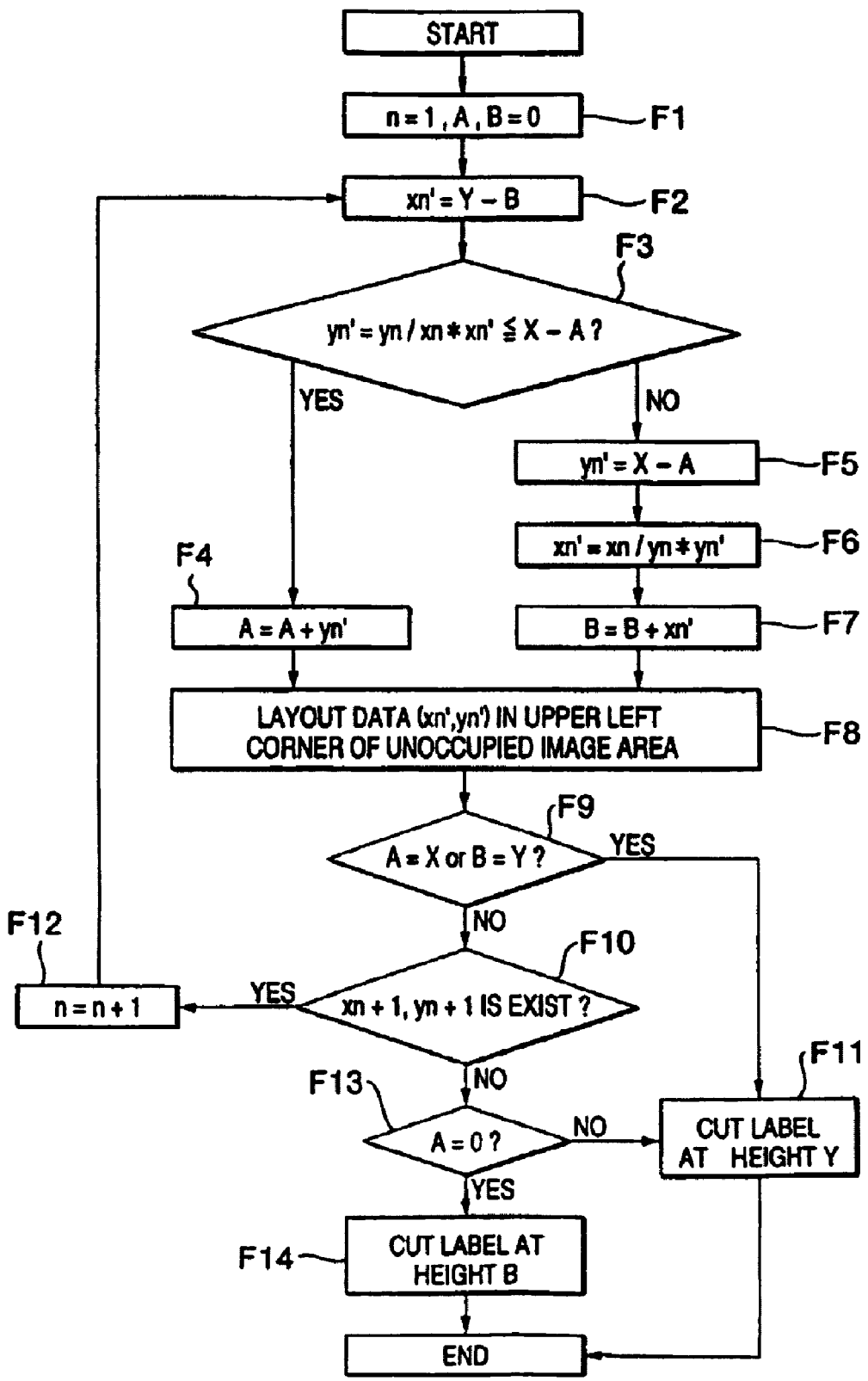
FIG. 16 is a flowchart of a second example layout process for image data.

In Step F1 of FIG. 16, the parameter n is set to 1 and the variables A and B defined in the first example are set to 0. In Step F2, the width xn' of the proportional image data obtained by enlarging or reducing the nth image data having a width xn is set to Y−B and stored in memory.

In Step F3, the length yn' of this enlarged or reduced image data is found based on the width xn' determined in Step F2 (yn'=(yn/xn*xn'), and this length yn' is compared to the difference X−A. If yn'≦X−A (Yes in F3), then the process continues to Step F4. If yn'>X−A (No in F3), then the process jumps to Step F5.

If yn'≦X−A, this signifies that the enlarged or reduced length y1' for the first image data can fit within the entire width X of the print area on one page when the enlarged or reduced width x1' for the same data is set to the entire length Y of the print data area. In this case, the proportional image data (xn', yn') determined in Steps F2 and F3 is arranged in the unoccupied image area. Then, in Step F4, the variable A is set to A+yn' and stored in memory.

On the other hand, if yn'>X−A, this signifies that the enlarged or reduced length y1' for the first image data cannot fit within the entire width X of the print area when the enlarged or reduced width x1' for the same data is set to the entire length Y of the print area on one page. In this case, the X direction is used in place of the Y direction as the reference for proportionally altering the image size. Accordingly, in Step F5, the length yn' of the enlarged or reduced image data is set to X−A and stored in memory.

In Step F6, the width xn' of this enlarged or reduced image data is found based on the length yn' determined in Step F5 (xn'=(xn/yn)*yn'). In Step F7, the variable B is set to B+xn' and stored in memory.

In Step F8, the proportional image data (xn', yn') determined in Steps F2 and F3 or in Steps F5 and F6 is laid out in the address area corresponding to the unoccupied image area beginning from the top address, that is, the upper left corner. At this time, the percentage of enlargement or reduction from the original image data along with addresses indicating the layout position range of the proportional image data are associated with the addresses of the original image data and written as part of the print data to a prescribed area of the RAN 136.

In Step F9, it is determined whether the variable A is equal to X (A=X) or the variable B is equal to Y (B=Y). If one of these two conditions is met (Yes in F9), then this indicates that the print area on one page is filled with image data, and the process jumps to Step F11. In Step F11, a cutting position for cutting the tack sheet 13 in the widthwise direction at the length Y is written as part of the print data to a prescribed area in the RAM 136.

However, if neither of the above two conditions is met (No in F9), then this indicates that the print area for one page still has some blank space and the process continues to Step F10. In Step F10, is determined whether there is another image data. If another image data exists (Yes in F10), then in Step F12 the parameter n is incremented by 1 and the process returns to Step F2. If no image data remains (No in F10), then the process continues to Step F13.

In Step F13, it is determined whether the variable A is 0. If the variable A is equal to 0 (Yes in F13), then this indicates that the portion of the print area on the page includes an area with no printing and the process continues to Step F14. In Step F14, a cutting position for cutting the tack sheet 13 in the widthwise direction at a position B is written as a part of the print data to a prescribed area of the RAM 136. However, if the variable A is not 0 (No in F13), then this indicates that the current page will be printed across the entire length Y of the print area. Therefore, the process jumps to Step F11, in which a cutting position for cutting the tack sheet 13 in the widthwise direction at the length Y is written as part of the print data to a prescribed area of the RAM 136.

With this process, image data elongated in the horizontal direction is displayed or printed larger than in the first example process.

While either the first or second example can be chosen arbitrarily, it is desirable to employ the first process when the data having the highest priority is elongated vertically and the second process when the data having the highest priority is elongated horizontally in order that data having a high priority is displayed at a larger size. Accordingly, it is a good idea to compare the vertical and horizontal lengths of the data having the highest priority after determining the order of priority.

Next, a third example of a layout process when only image data is read will be described with reference to FIGS. 18–21. In this example, no weight is attached to any of a plurality of selected image data. Rather the print area is divided into independent areas each associated with one of the image data, and each image data is enlarged or reduced to fit into its corresponding area at a maximum size.

In Step G1, a minimum reduction percentage MR is set to a predetermined allowable percentage for reducing the image data. This is to prevent the image data from being reduced so much as to become unrecognizable.

In Step G2, image data is read into the editor using one of the method's described above. In Step G3, a partition number N is set to the number of areas for partitioning the rectangular print area on one sheet of the tack sheet 13. This partition number N can be set in anyway, for example, equal to the number of image data read.

Figure 21:
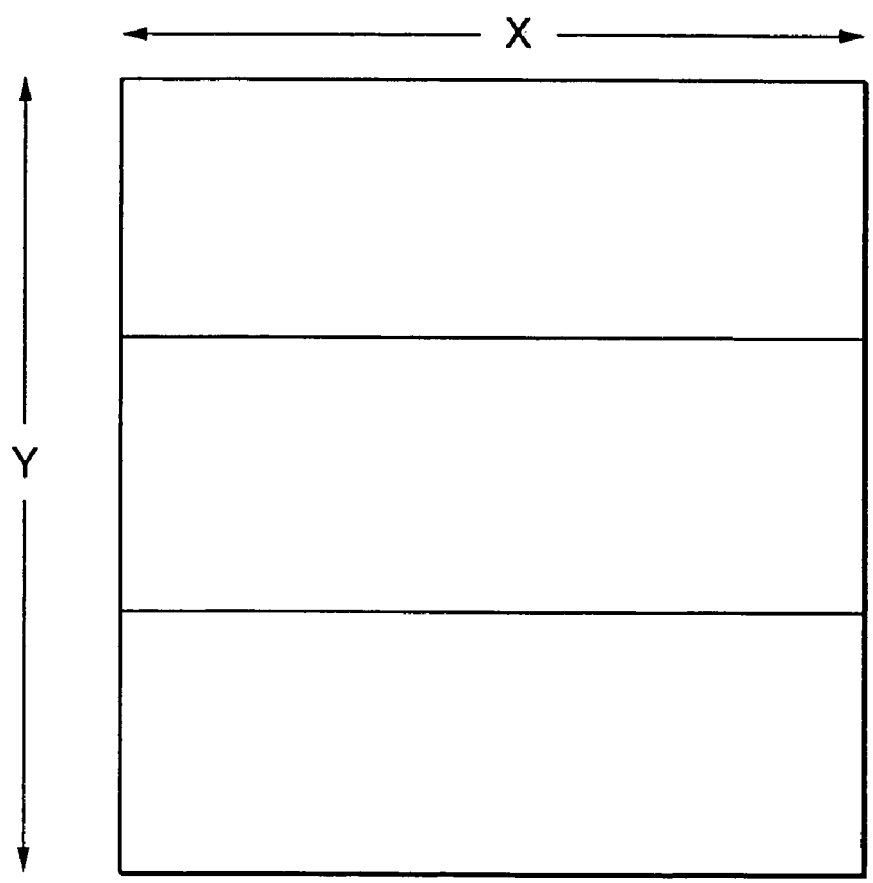
FIG. 21 is a conceptual diagram showing the print image of a prescribed area partition in an example image data layout according to the process of FIG. 16.

In Step G4, the area on one sheet of the tack sheet 13 is divided into partitions based on a partition number N set in Step G3. For example, it is possible to divide the area on one sheet of the tack sheet 13 into three areas of equal size using dividing lines along the x-axis, as shown in FIG. 21. The area on the tack sheet 13 can also be divided according to any desired layout to form partitioned areas of different sizes. A number is assigned to each of these partitioned areas in order, for example, beginning from the upper left.

In Step G5, a parameter I in memory is set to 1. The parameter I identifies the image being laid out and the corresponding partitioned area. And order of priority for layout can be predetermined for each image as described in the first example. In Step G6, proportional image data is laid out in the corresponding area after enlarging or reducing the Ith image data to the maximum size possible for fitting in the Ith partitioned area.

In Step G7, the parameter I is incremented by 1. In Step G8, it is determined whether the parameter I is less than the sum N+1. If the parameter I is less than N+1 (Yes in G8), then the process returns to Step G6 and repeats the layout process for the next image data. However, if the parameter I is equal to or greater than N+1 (No in G8), then the process continues to Step G9 to print the data with the cutting printer 11.

Figure 19:
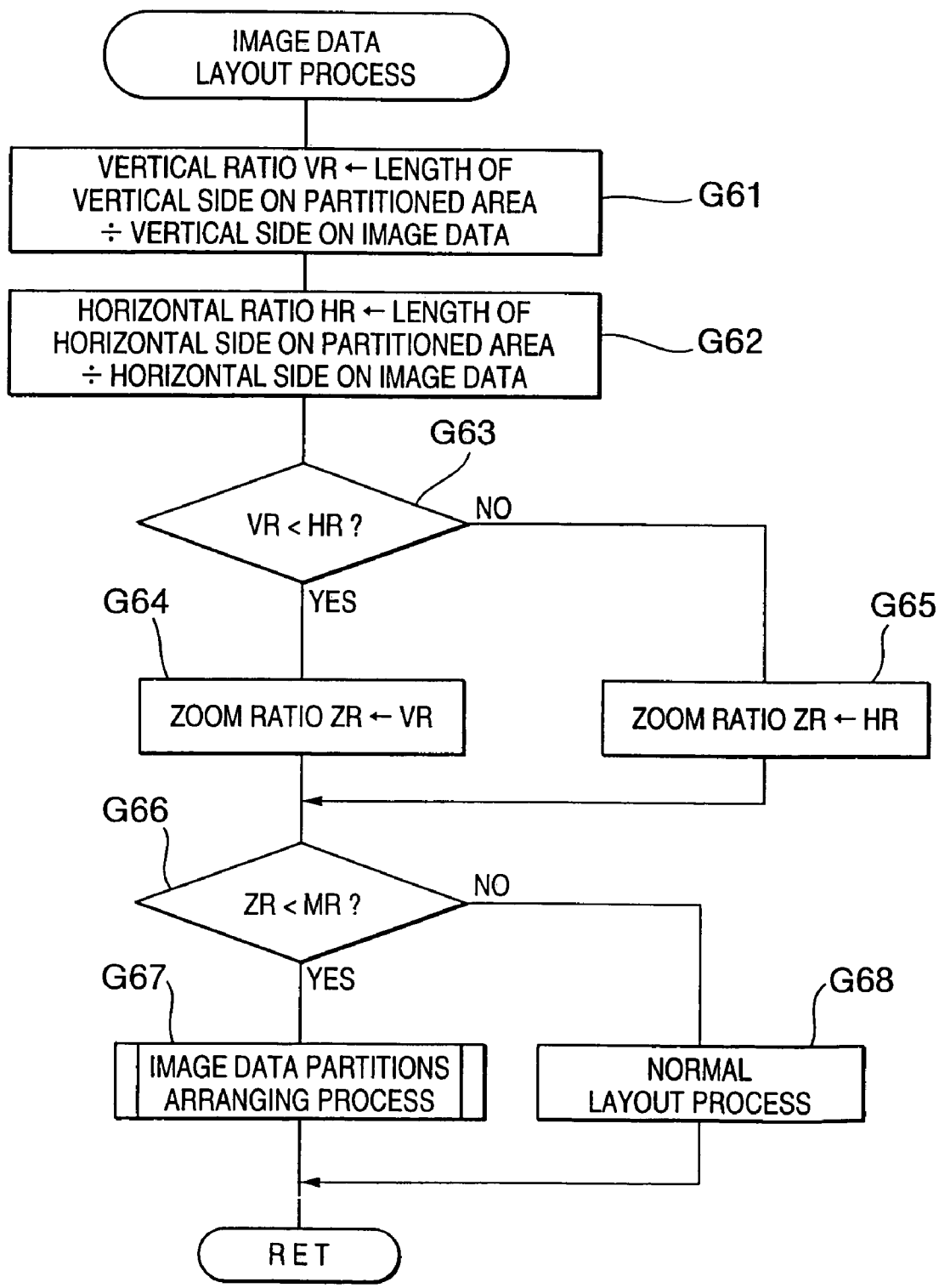
FIG. 19 is a flowchart of a third example layout process for image data.

Here, the process in Step G6 will be described in more detail with reference to FIG. 19. In Step G61, a calculation is performed to determine how much the vertical length of the image data needs to be enlarged or reduced in order to fit into the corresponding partitioned area at a maximum size. To accomplish this, a vertical ratio VR is set to the result of dividing the length of the vertical side on the partitioned area by the length of the vertical side on the image data. In Step G62, a horizontal ratio HR is calculated in the same way as the vertical ratio VR was calculated in Step G61.

In Step G63, the size relationship of the vertical ratio VR and the horizontal ratio HR is determined. If the horizontal ratio HR 18 the larger of the two (Yes in G63), this indicates that the image data must be enlarged or reduced based on the vertical ratio VR in order to achieve a maximum size for the partitioned area. Therefore, the process continues to Step G64 and the vertical ratio VR is written to a prescribed area of the RAM 136 as a zoom ratio ZR for the image data. However, if the vertical ratio is the larger of the two (No in G63), this indicates that the image data must be enlarged or reduced based on the horizontal ratio HR in order to achieve a maximum size. Therefore, the process jumps to G65, where the horizontal ratio HR is written to a prescribed area of the RAM 136 as the zoom ratio ZR for the image data.

In Step G66, the zoom ratio ZR of the image data is compared to the minimum reduction percentage MR set in Step G1. If the zoom ratio ZR is equal to or greater than the minimum reduction percentage MR (No in G66), then the normal layout process is performed in Step G68. In other words, the proportional image data that has been proportionally reduced or enlarged from the original image data based on the zoom ratio ZR determined in Step G64 or Step G65 is laid out in the address area of the corresponding partitioned area beginning from the top address (the upper left). At this time, the percentage of enlargement or reduction from the original image data along with addresses indicating the layout position range of the proportional image data are associated with the addresses of the original image data and written as part of the print data to a prescribed area of the RAM 136.

However, if the zoom ratio ZR is lass than the minimum reduction percentage MR (Yes in G66), then the image data has been reduced too much and the process for arranging image data partitions is performed in Step G67.

Figure 20:
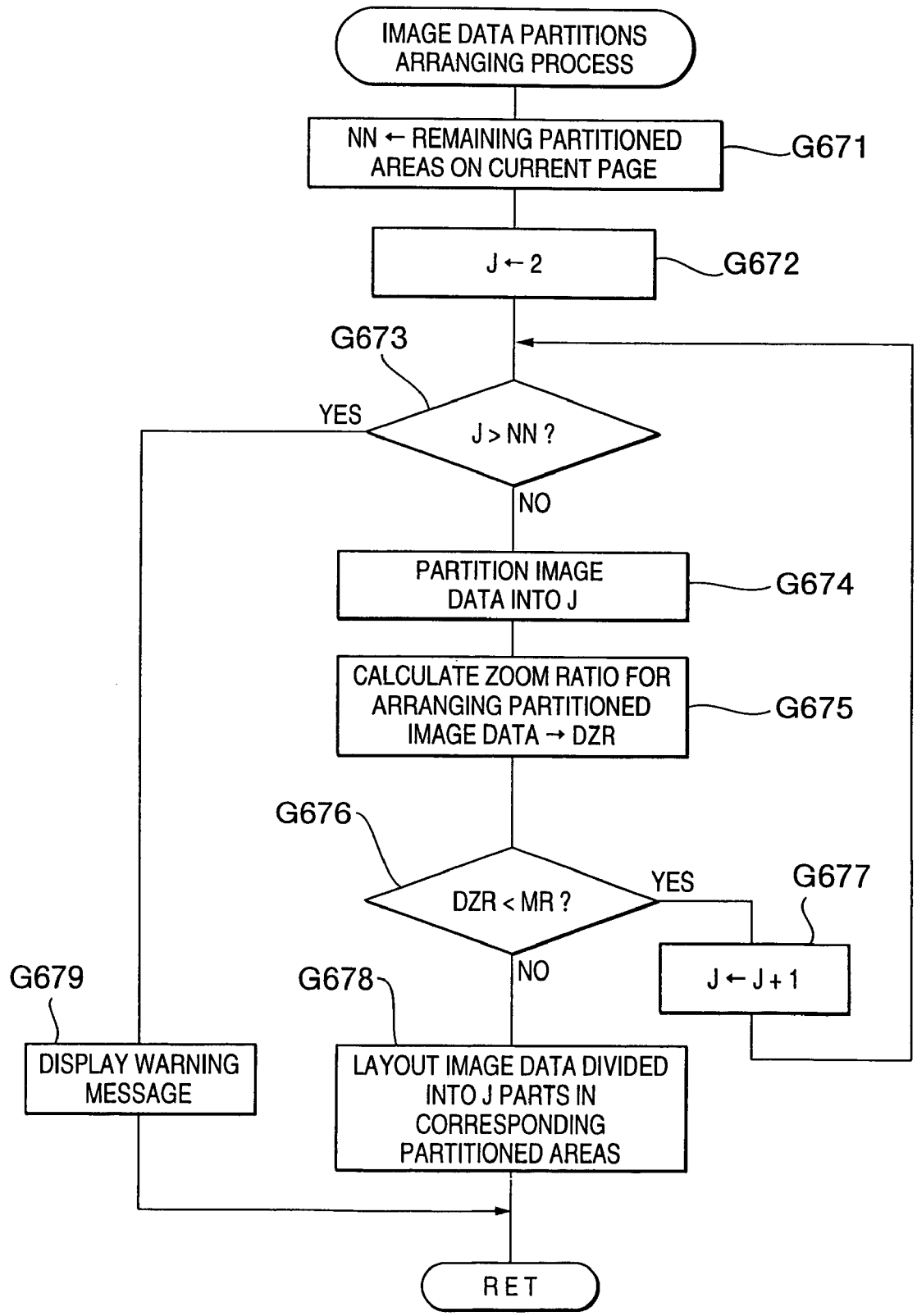
FIG. 20 is a flowchart of a third example layout process for image data.

Here, the process for arranging image data partitions of Step G67 will be described in more detail with reference to FIG. 20. In Step G671, a number of remaining partitioned areas NN is found based on the remaining partitioned areas on the current page of the tack sheet 13, including the partitioned area of the current layout process, in which proportional image data has not been laid out. In Step G672, a parameter J in memory is set to the value 2. In step G673, the parameter J is compared to the remaining partitioned areas NN. If the parameter J is larger than the variable NN (Yes in G673), this indicates that there is no margin for dividing the image data and the process jumps to Step G679. In Step G679, a warning message indicating that the image data cannot be printed is displayed on the current page. The user can be notified of the problem by displaying the warning on the display 132, or alternatively by issuing a sound from a speaker (not shown) or the like.

However, if the parameter J is less than or equal to the variable NN (No in G673), then the image data is partitioned into a number equivalent to the parameter J in Step G674. For example, if the print area on the tack sheet 13 is divided into partitioned areas of equal widths using dividing lines along the x-axis, as shown in FIG. 21, then the image data can also be divided along the x-axis into areas of equal length to match the partitioned areas of the print area.

In Step G675, a calculation is performed as described in Steps G61–G65 to determine a divided zoom ratio DZR for each image data that has been divided into J parts for layout in J partitioned areas. In Step G676, the divided zoom ratio DZR is compared to the minimum reduction percentage MR set in Step G1. If the divided zoom ratio DZR is equal to or greater than the minimum reduction percentage MR (No in G676), then the layout process described in Step G68 is performed in Step G678 for the image data divided into J parts.

However, if the divided zoom ratio DZR is less than the minimum reduction percentage MR (Yes in G676), then the parameter J is incremented by 1 in Step G677. The process returns to Step G673 and the above steps are repeated.

With this process, space can be generated on the right side of each partitioned area, but the image data is laid out independently in its own partitioned area. Therefore, there is little chance that image data having lower priority will be displayed at a smaller size, as in the first example. Further, all image data is laid out in a prescribed common direction, thereby enabling the user to view a plurality of image data at once without changing the viewing angle. In addition, it is possible to detect in advance whether proportional image data will be reduced so much as to be difficult to see clearly by comparing a zoom ratio to a predetermined minimum reduction percentage when laying out image data in a partitioned area. When the zoom ratio is smaller than the minimum reduction percentage, the image data is divided into a plurality of partitioned areas and arranged as proportional image data, thereby preventing relatively large image data from being displayed at a small size. Further, a warning is issued in prescribed cases in order to notify the user that the zoom ratio of proportional image data is smaller than the minimum reduction percentage even when arranging the proportional image data in a plurality of partitioned areas remaining in a prescribed print area.

Next, a process for reformatting text and image data with the editor will be described for the case when data read by the editor is determined to be both text and image data according to the process described in FIG. 8. When the combination determining data indicates that data read by the editor is both text and image data, the image data is arranged in the address area corresponding to the area of the image area 158 shown in FIG. 7, while the text data is laid out in the address area corresponding to the text area 159. A first example of this process will be described next with reference to FIGS. 22 and 23.

In the present example, the rectangular print area on one page of the tack sheet 13 is divided according to a prescribed occupation ratio into a text area for laying out text data and an image area for laying out image data. Each text data and image data is laid out in corresponding address areas. Although there are several possible layouts, in the example of the present embodiment we will divide the print area in the lengthwise direction of the tack sheet 13 into two rectangular areas. The process for laying out text data and image data into these areas can be similar to those described in FIGS. 9, 10, 14 and 15. In other words, a plurality of text data is laid out in a series in the text area with a line feed code separating each text data and a reformatting process is executed for each. A plurality of the image data, each assigned with a priority, is arranged in the image area. The image data are proportionally enlarged or reduced in order to fit into the unoccupied image area at a maximum size and in the order to priority. As described in FIGS. 18–21, it is also possible to arrange each image data in an independent partitioned area at the maximum size possible for fitting in the partitioned area.

Figure 23:
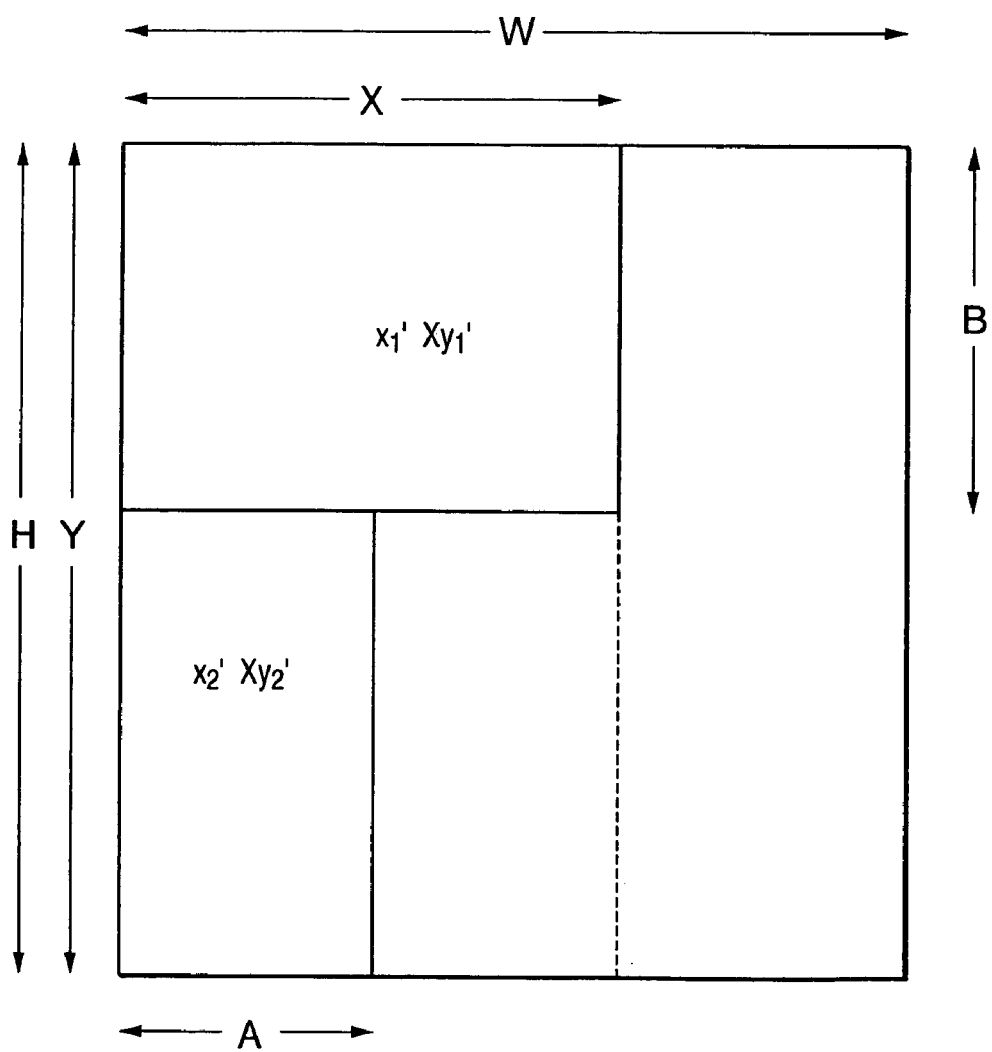
FIG. 23 is a conceptual diagram showing the print image of an example text and image data layout according to the process of FIG. 22.

As shown in FIG. 23, W is set to the length (number of dots) corresponding to the width of the print area on the tack sheet, while H is set to the length corresponding to the length of one page of the tack sheet 13. In addition, X is set to the width and Y is set to the length of the image area. In other words, the occupation ratio of the image area is X/W, while the occupation ratio of the text area is (W–X)/W. An n number of image data are proportionally enlarged or reduced and laid out in the address area corresponding to this print area (X, Y), while one or more text data are laid out in the address area corresponding to the text area (W–X, Y). Let us say that the original size of the nth image data as displayed in the browser is (xn, yn) and the size of the proportional image data in the editor window after the same data has been proportionally enlarged or reduced is (xn', yn'). By setting the top left point in the image area to the reference point, we can set B as the distance of the image in the Y direction on the display 132 when the proportional image data occupies the entire width X, and A as the distance of the image in the X direction on the display 132 when the proportional image data occupies the entire length Y.

Figure 22:
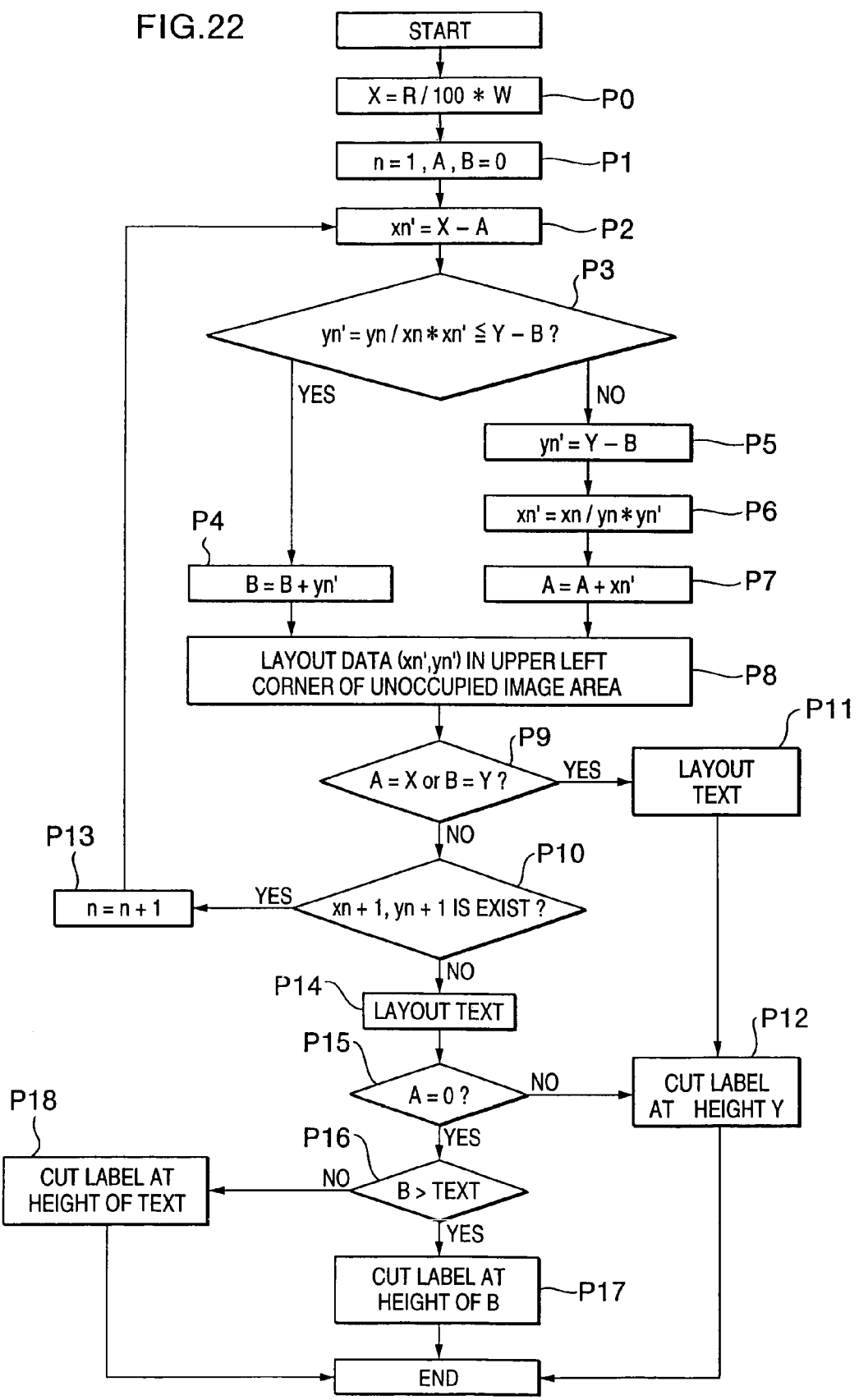
FIG. 22 is a flowchart of a first example layout process for text and image data.

In Step P0 of FIG. 22, the print area for one page of the tack sheet 13 is divided along the lengthwise direction of the tack sheet 13 using an occupation ratio R and the width X of the image area is found by the expression X (R/100)*W. Steps P1–P8 executed after Step P0 are essentially the same as Steps E1–E8 described for FIG. 14. Therefore, a description of these steps will be omitted here.

In Step P9, it is determined whether the variable A is equal to X (A=X) or the variable B is equal to Y (B=Y). If one of these two conditions is met (Yes in P9), then this indicates that the print area on one page is filled with image data, and the process jumps to Step P11. In Step P11, the text data is laid out in the text area and the process continues to Step P12. The process for laying out text data is the same as that described above for FIG. 9. Therefore, a description of this process will be omitted here. In order to simplify the description of this process, we will assume here that the text data does not exceed the text area for one page.

However, if neither of the above two conditions is met (No in P9), then this indicates that the print area for one page still has some blank space and the process continues to step P10. In Step P10, it is determined whether there is another image data. If another image data exists (Yes in P10), then in Step P13 the parameter n is incremented by 1 and the process returns to Step P2. If no image data remains (No in P10), then the process continues to Step P14. In Step P14, text data is arranged in the text area. At this time, the text data is arranged in unused spaces in the image area in order to make effective use of the print area and arrange the text data in a compact manner.

In Step P15, it is determined whether the variable A is 0. If the variable A does not equal 0 (No in P15), then this indicates that the current page of the tack sheet 13 will be printed across the entire length of the print area. Therefore, the process jumps to Step P12. In which a cutting position for cutting the tack sheet 13 in the widthwise direction at the height H, that is, the length of one page, is written as part of the print data to a prescribed area of the RAM 136. However, if the variable A equals 0 (Yes in P15), then this indicates that the bottom portion of the print area on the page includes an area with no printing and the process continues to Step P16. In Step P16, it is determined whether the variable B is greater than the height of the text data (with the distance from the position of the first line to the position of the last line), in other words, whether the image data extends lower than the text data. If the variable B is greater than the height of the text data (Yes in P16), then the process continues to Step P17. In Step P17, a cutting position for cutting the tack sheet 13 in the widthwise direction at the position B is written as a part of the print data to a prescribed area of the RAM 136. However, if the variable B is not greater than the height of the text data (No in P16), then the process jumps to Step P18. In Step P18, a cutting position for cutting the tack sheet 13 in the widthwise direction at the height of the text data is written as a part of the print data to a prescribed area of the RAM 136.

With this process, it is possible to arrange image and text data automatically in address areas corresponding to the print areas and to achieve a compact and well-organized display without requiring complex editing processes.

Next, a second example of a process for reformatting both text and image data will be described with reference to FIGS. 24 and 25. In this example, one page of the tack sheet 13 is divided into a text area and an image area according to a prescribed occupation ratio and data are laid out in their corresponding areas according to a method similar to that described in the first example. However, one page of the tack sheet 13 is treated as an area elongated in the horizontal direction rather than in the vertical direction, as in the first example. Therefore, in the first example image data that is longer in the vertical direction can be displayed relatively large in the layout, while image data longer in the horizontal direction is displayed relatively smaller. In the second example, however, image data elongated in the horizontal direction is displayed relatively larger.

Figure 25:
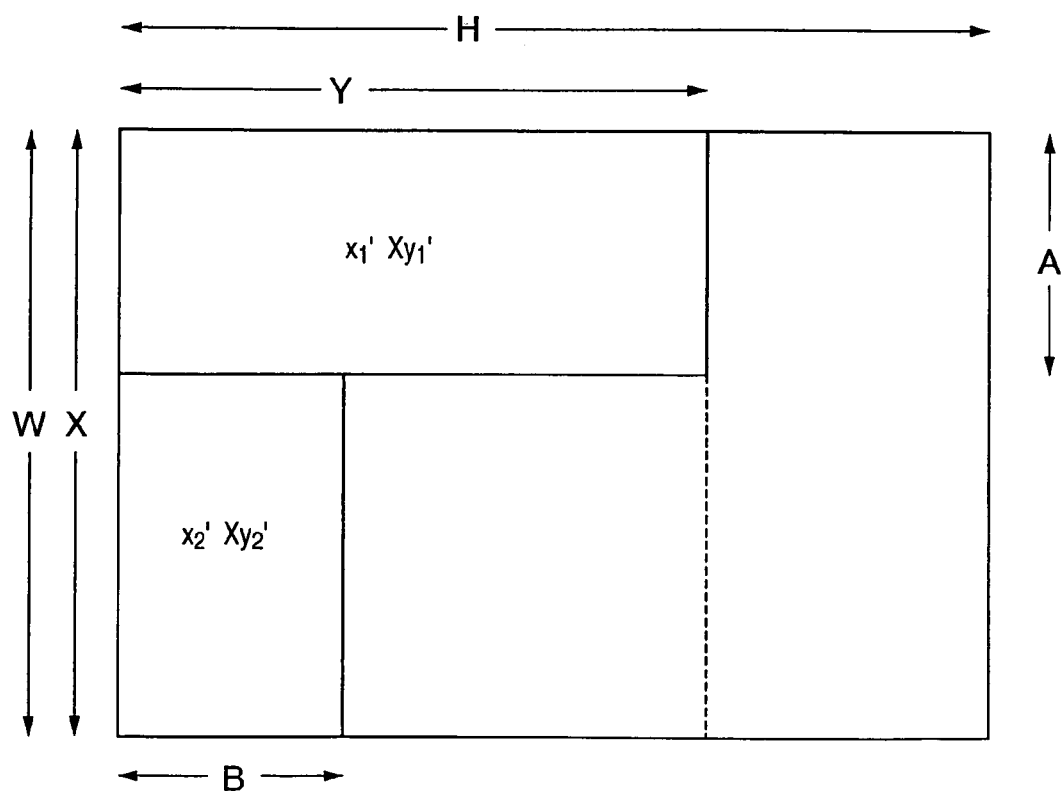
FIG. 25 is a conceptual diagram showing the print image of an example text and image data layout according to the process of FIG. 24.

As shown in FIG. 25, n selected image data of a rectangular shape and text data are arranged in the address areas corresponding to the image area and text area, formed by dividing the rectangular print area on one page of the tack sheet 13 at a prescribed occupation ratio. Here, the tack sheet 13 is rotated 90 degrees from that shown in FIG. 23 in order that the height H side corresponding to the length of one page of the tack sheet 13 in FIG. 23 is rotated to the top side of the image. The priority for arranging these n image data in this example is set according to size or the like and written to a prescribed area of the RAM 136. Based on the order written to the RAM 136, proportional image data is arranged at a maximum size and in a common layout direction inside the address area corresponding to an unoccupied portion of the print area.

Figure 24:
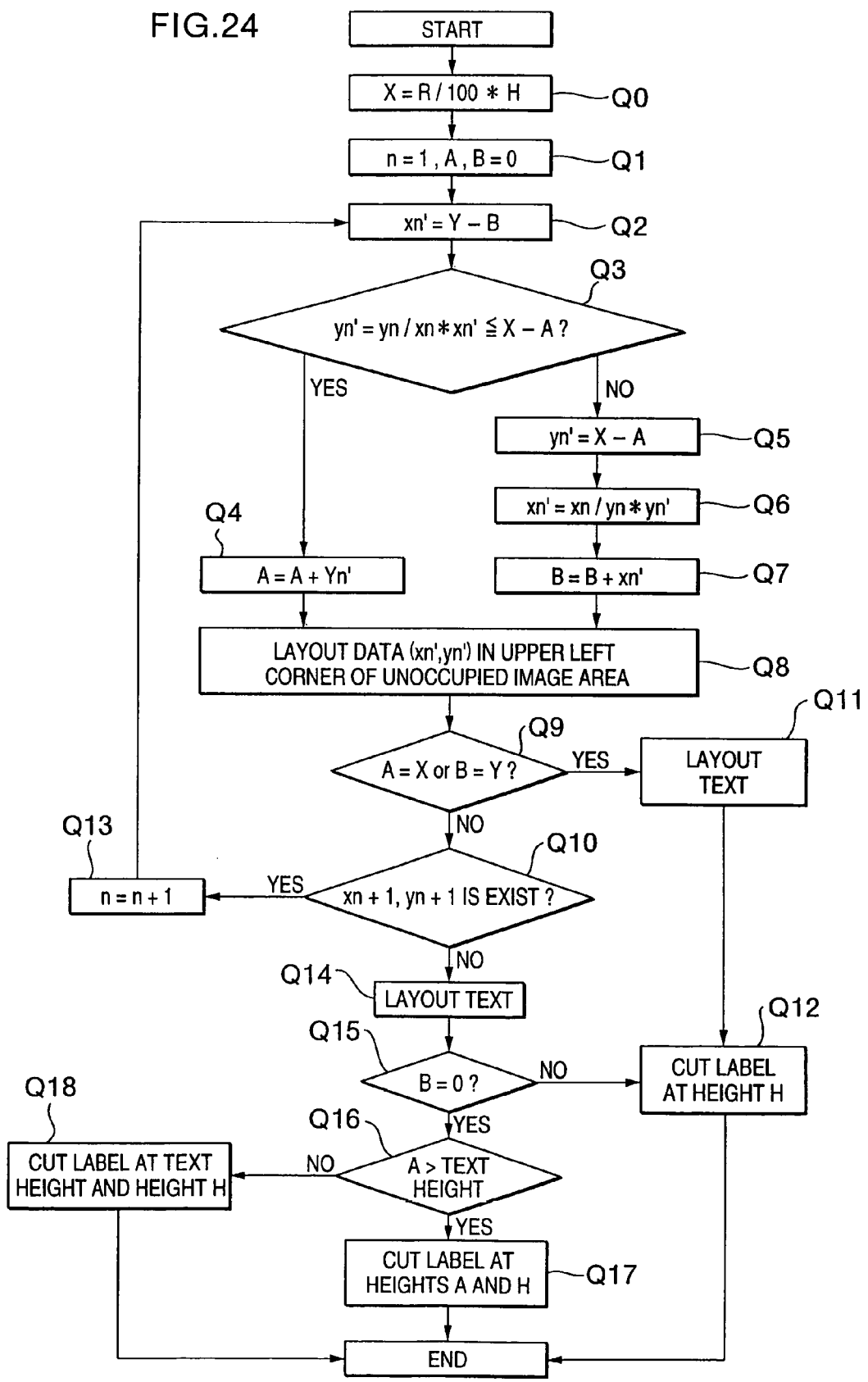
FIG. 24 is a flowchart of a second example layout process for text and image data.

In Step Q0 of FIG. 24, the print area for one page of the tack sheet 13 is divided along the widthwise direction of the tack sheet 13 using the occupation ratio R, and the width Y of the print area is found by the expression Y=(R/100)*H. Steps Q1–Q8 executed after Step Q0 are essentially the same as Steps F1–F8 described for FIG. 16. Therefore, a description of these steps will be omitted here.

In Step Q9, it is determined whether the variable A is equal to X (A=X) or the variable B is equal to Y (B=Y). If one of these two conditions is met (Yes in Q9), then this indicates that the print area on one page is filled with image data, and the process jumps to Step Q11. In Step Q11, the text data is laid out in the text area and the process continues to Step Q12. The process for laying out text data is the same as that described above for FIG. 9. Therefore, a description of this process will be omitted here. In order to simplify the description of this process, we will assume here that the text data does not exceed the text area for one page.

However, if neither of the above two conditions is met (No in Q9), then this indicates that the print area for one page still has some blank space and the process continues to Step Q10. In Step Q10, it is determined whether there is another image data. If another image data exists (Yes in Q10), then in Step Q13 the parameter n is incremented by 1 and the process returns to Step Q2. If no image data remains (No in Q10), then the process continues to Step Q14. In Step Q14, text data is arranged in the text area. At this time, the text data is arranged in unused spaces in the image area in order to make effective use of the print area and arrange the text data in a compact manner.

In Step Q15, it is determined whether the variable B is 0. If the variable B does not equal 0 (No in Q15), then this indicates that the current page of the tack sheet 13 will be printed across the entire width of the print area. Therefore, the process jumps to Step Q12, in which a cutting position for cutting the tack sheet 13 in the widthwise direction at the height H, that is, the length of one page, is written as part of the print data to a prescribed area of the RAM 136. However, if the variable B equals 0 (Yes in Q15), then this indicates that the bottom portion of the print area on the page includes an area with no printing and the process continues to Step Q16. In Step 016, it is determined whether the variable A is greater than the height of the text data (the distance from the position of the first line to the position of the last line), in other words, whether the image data extends lower than the text data. If the variable A is greater than the height of the text data (Yes in Q16), then the process continues to Step Q17. In Step Q17, cutting positions for cutting the tack sheet 13 in the lengthwise and widthwise directions at the position A and at the height H of one page are written as part of the print data to a prescribed area of the RAM 136. However, if the variable A is not greater than the height of the text data (No in Q16), then the process jumps to Step Q18. In Step Q18, cutting positions for cutting the tack sheet 13 in the lengthwise and widthwise directions at the height of the text data and the height H of one page are written as part of the print data to a prescribed area of the RAM 136.

With this process, image data elongated in the horizontal direction is displayed or printed larger than in the first example process.

Figure 26:
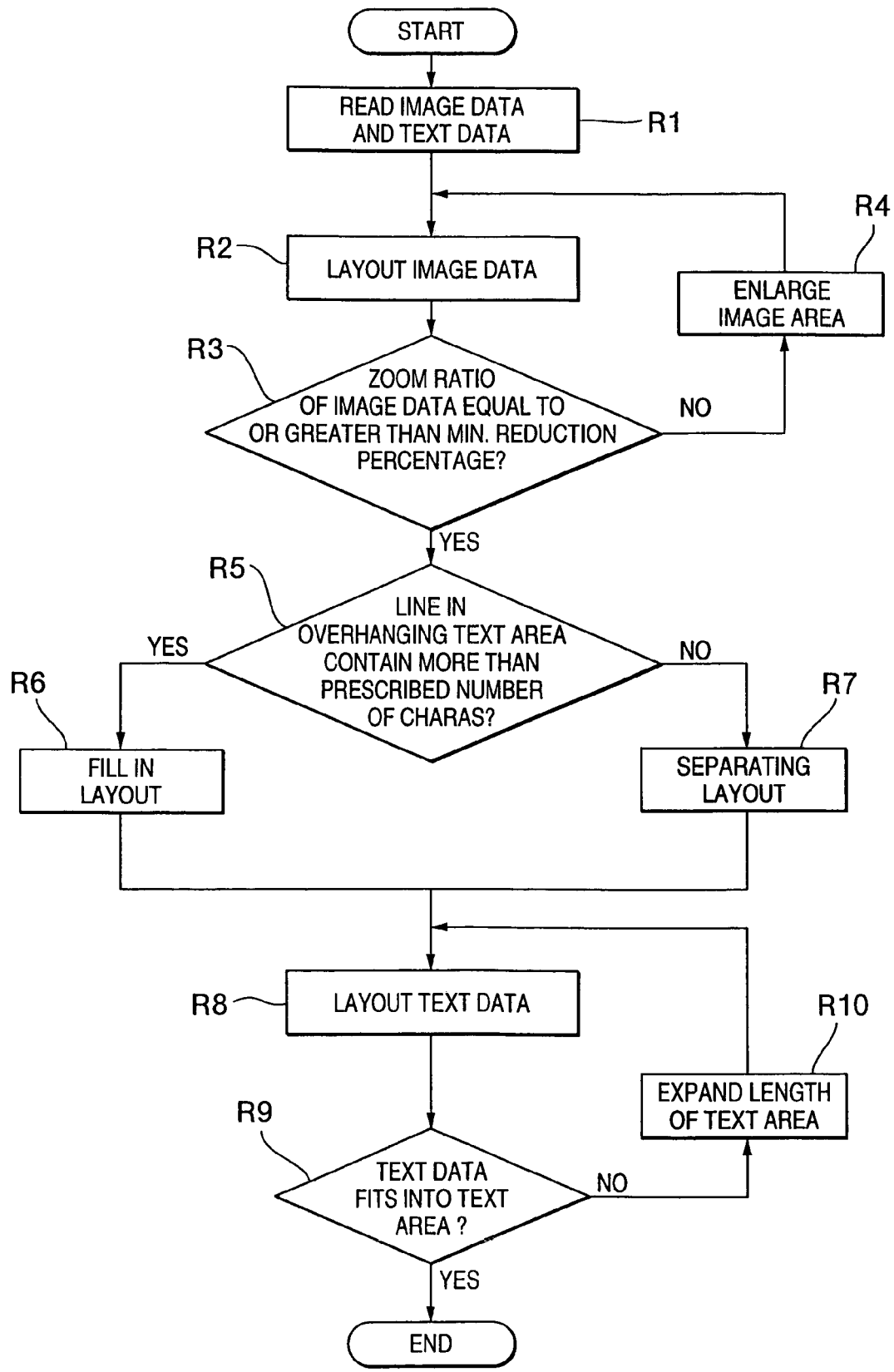
FIG. 26 is a flowchart of a third example layout process for text and image data.

Next, a third example of a process for reformatting both text and image data will be described with reference to FIGS. 26 and 27. In this example, the image area is partitioned into image and text areas according to an initial occupation ratio. Here, the image area is allocated in the upper left corner of the image area with the remainder allocated as the text area. The areas are enlarged according to the size of the data to be arranged therein.

Figure 27:
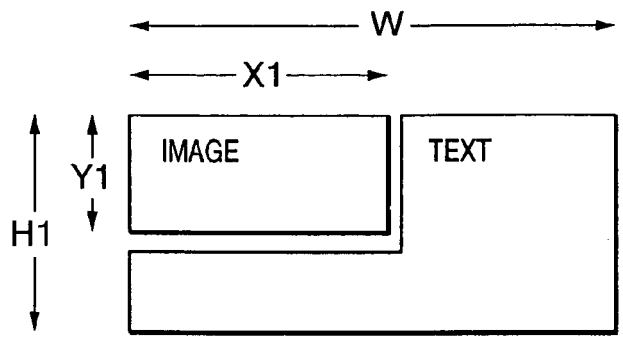
FIGS. 27(*a*) through 27(*d*) are conceptual diagrams showing the print image of an example text and image data layout according to the process of FIG. 26.
Figure 27:
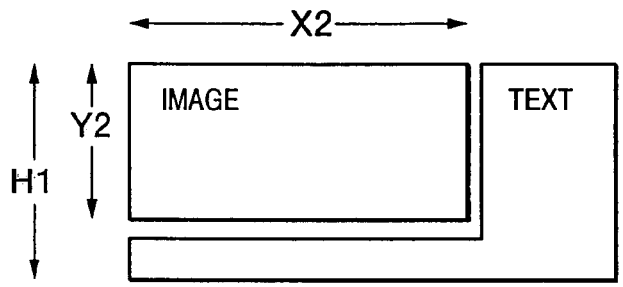
Figure 27:
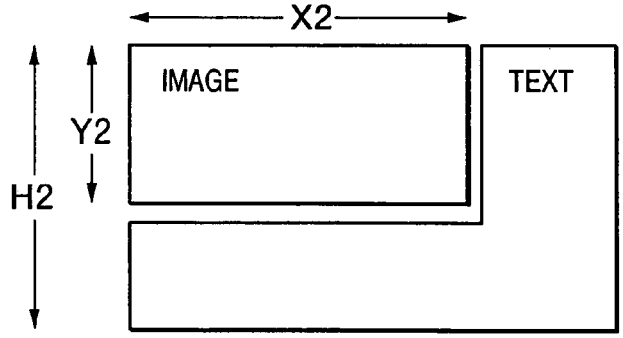
Figure 27:
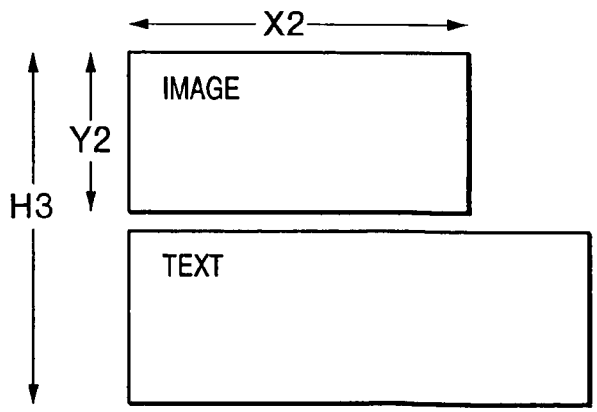

As shown in FIG. 27(*a*), a rectangular print area having a width W and a height H1 (shorter than the height of one page of the tack sheet 13) is partitioned according to a prescribed occupation ratio into an image area (X1×Y1) near the upper left corner and a text area in the remaining portion. A number n of selected rectangular image data is arranged in the image area, while text data is arranged in the text area. Any of the methods described above can be used to lay out the text and image data in their respective areas. The image area layout in the print area is not limited to the example shown in FIG. 27(*a*). It is also possible to position this image area near the upper right corner or in the center of the print area.

In Step R1, image data and text data are read into the editor. In Step R2, the image data is laid out in the image area according to one of the methods described above. In Step R3, the zoom ratio of each image data laid out in the image area is found according to the process described in Steps G61–G65 of FIG. 19. The zoom ratio found here is compared to the minimum reduction percentage set in advance by the user. If the zoom ratio is equal to or greater than the minimum reduction percentage (Yes in R3), then the process continues to Step R5. If the zoom ratio is less than the minimum reduction percentage (No in R3), then the process jumps to Step R4.

In Step R4, the image area is geometrically enlarged in the print area. That is, the vertical and horizontal lengths of the image area are enlarged by the same proportion. This process can prevent the proportional image data from being reduced so small as to be difficult to see. The result of this geometric enlargement is illustrated by FIG. 27(*b*), wherein Y2/X2=Y1/X1. Here, the ratio for enlarging the image area can be preset to any value by the user. Subsequently, Steps R2 and R3 are repeated for the enlarged image area.

In Step R5, it is determined whether lines of text in an overhanging text area contain a prescribed number or more of characters when displayed at a prescribed point size. The overhanging text area is defined as the narrow text area on the left or right side of the image area (the position adjacent to the text data in the direction of the character arrays). This is designed to prevent lines of text displayed in the overhanging text area from having too few characters that can make the text difficult to read.

If the number of characters in lines of text in the overhanging text area is equal to or greater than the prescribed number (Yes in R5), then the process continues to Step R6, where the text data is laid out according to a fill in layout for arranging text in the overhanging text area. However, if the number of characters in lines of text in the overhanging text area is less than the prescribed number (No in R5), then the process jumps to Step R7, where text data is not laid out in the overhanging text area but is laid out according to a separating layout.

In Step R8, text data is laid out in the text area according to either the fill in layout or the separating layout determined in Step R6 or Step R7. Text data can be laid out according to one of the methods described above. In Step R9, it is determined whether the text data fits into the text area when displayed at a prescribed point size.

If the text data does fit in the text area (Yes in R9), then the data layout process of the present example ends. However, if the text data does not fit in the text area (No in R9), then the length of the text area is expanded by enlarging the height of the print area, without changing the image area.

For example, if the fill in layout is employed, then the height of the print area is set to H2, as shown in FIG. 27(c), where H2>H1. If the separating layout is employed, then the height of the print area can be set to H3, as shown in FIG. 27(d), where H3>H2. With this method, text data can be suitably displayed without affecting the image display.

With the process described above, both image data and text data can be laid out without excessively reducing the data as to be difficult to see.

According to the embodiments described above, the user can display and print images and text in a well-organized manner by performing simple operations to specify the text and image data in a browser or word processing program. This process can be used to create labels having a size suitable for being pasted in a notebook or the like. By printing only the necessary data on such a label, it is possible to prevent wasteful use of the tack sheets and enable the user to carry a lighter load of only essential data that can be referenced at any time.

In the embodiment described above, the present invention was applied to the example of printing tack sheets. However the present invention is not limited to this application, but can also be applied to general text and image data processing. Further, the data processor of the present invention is configured by a personal computer in the embodiment described above. However, the data processor of the present invention can be configured by a cutting printer only or both a cutting printer and a personal computer.

Although the above-described embodiment is applied to a small-size label producing apparatus, it can also be applied to a printer that is capable of printing on a cloth fabric or the like, an embroidery machine that stitches an embroidery on a cloth fabric, a device for forming a print surface of a stamp, or a monitor of a handy terminal such as a handy phone or PDA.

The invention claimed is:

1. A data processing device comprising:
   individual data identifying means for identifying that each piece of data in a block of data containing one or plural pieces of data is text data or image data, and providing an individual data identifying result;
   determining means for determining, based on the individual data identifying result, whether the block of data includes only the text data, only the image data or both the text data and the image data, and providing determination result;
   layout means for laying out the one or plural pieces of data according to a layout pattern that differs depending upon the determination result;
   area dividing means for dividing, when determination made by said determination means indicates that the one or plural pieces of data includes the text data and the image data, the layout area into a text area for laying out the text data and an image area for laying out the image data according to a predetermined ratio, wherein said layout means comprises image layout means for laying out one or more image data, each of the one or more image data having been enlarged or reduced by the same proportion, into the image area; and
   text layout means for laying out one or more text data in the text area.

2. The data processing device according to claim 1, further comprising:
   line feed code detecting means for detecting, when determination made by said determining means indicates that the one or plural pieces of data includes only the text data, a line feed code that may exist in the text data;
   prescribed code detecting means for detecting a prescribed code that may exist immediately before or after the line feed code detected by said line feed code detecting means; and
   line feed code deletion means for deleting, when detection made by said prescribed code detecting means indicates that the prescribed code is not detected, the line feed code detected by said line feed code detecting means.

3. The data processing device according to claim 1, further comprising:
   space character code detecting means for detecting, when determination made by said determining mean indicates that the one or plural pieces of data include only the text data, a space character code that may exist in the text data;
   count value control means for controlling a space counter to increment a count value of the space counter by one each time when the space character code is consecutively detected from the text data, and initialize the count value of the space counter to zero when a code other than the space character code is detected by said space character code detecting means;
   count value determining means for determining, when the space character code is not detected from the text data, that the count value of the space counter is equal to or greater than two indicating that two or more than two space character codes consecutively exist in the text data; and
   space character code deleting means for deleting the two or more than two space character codes when determination made by said count value determining means indicates that the count value of the space counter is equal to or greater than two.

4. The data processing device according to claim 1, further comprising:
   space character detecting means for detecting that only one space character exists at a head of a first line of the text data when determination made by said determining means indicates that the one or plural pieces of data include only the text data; and
   space character deletion means for deleting the one space character when determination made by said space character detecting means indicates that a space character exists at the head of the first line of the text data.

5. The data processing device according to claim 1, further comprising:
   arranging order setting means for setting, when determination made by said determining means indicates that the one or plural pieces of data includes only the image data, an order in which the one or plural pieces of data are arranged on a layout area; and
   proportional image data producing means for producing a proportionally enlarged or proportionally reduced image data so that each piece of data is proportionally enlarged or proportionally reduced to a maximum size that fits within an unoccupied layout area, the proportionally enlarged or proportionally reduced image data being produced in the order in which the one or plural pieces of data are arranged on the layout area.

6. The data processing device according to claim 5, wherein said layout means arranges arranging in an orientation relative to the layout area, the proportionally enlarged or proportionally reduced image data on the layout area in the order set by said arranging order setting means.

7. The data processing device according to claim 6, further comprising divided layout area setting means for dividing the layout area into a predetermined number of partitioned areas, wherein said proportional image data producing means produces the proportionally enlarged or proportionally reduced image data so that each piece of data is proportionally enlarged or proportionally reduced to a maximum size that fits within a designated one of the predetermined number of partitioned areas when the proportionally enlarged or proportionally reduced image data is arranged in an orientation relative to the layout area.

8. The data processing device according to claim 1, wherein the layout means lays out each identified piece of data in the block of data.

9. The data processing device according to claim 1, wherein the layout pattern is determined based on a layout process which differs depending on the determination result, the layout process determining an arrangement of the one or plural pieces of data on at least one of a recording medium and a display.

10. A data processing device comprising:
individual data identifying means for identifying that each piece of data in a block of data containing one or plural pieces of data is text data or image data, and providing an individual data identifying result;
determining means for determining, based on the individual data identifying result, whether the block of data includes only the text data, only the image data or both the text data and the image data, and providing determination result;
layout means for laying out the one or plural pieces of data according to a layout pattern that differs depending upon the determination result; and
control means for controlling a printing section to print the one or plural pieces of data on an elongated, web-like substrate having a width according to the layout pattern, controlling a cutting section to cut the substrate along the width each time the substrate is printed a predetermined length, and further controlling the cutting section to cut, when printing of the one or plural pieces of data has finished, the substrate along a line between a printed region and a non-printed region of the substrate.

11. A data processing device comprising:
line feed code/space character detecting means for detecting a line feed code and a space character which may exist in text data;
prescribed code detecting means for detecting a prescribed code that may exist immediately before or after the line feed code detected by said line feed code/space character detecting means;
line feed code deletion means for deleting, when detection made by said prescribed code detecting means indicates that the prescribed code is not detected, the line feed code detected by said line feed code detecting means;
a space counter that is incremented by one each time when said line feed code/space character detecting means consecutively detects the space character and is initialized to zero when a code other than the space character code is detected by said line feed code/space character detecting means;
count value determining means for determining, when the code other than the space character code is detected by said line feed code/space character detecting means, that a count value of said space counter is equal to or greater than two indicating that two or more than two space character codes consecutively exist in the text data; and
space character code deleting means for deleting the two or more than two space character codes when determination made by said count value determining means indicates that the count value of the space counter is equal to or greater than two.

12. The data processing device according to claim 11, further comprising:
blank line flag storing means for storing a blank line flag representing whether a character other than a space character exists before a line feed code in one logical line;
blank line flag control means for controlling on/off of the blank line flag in such a manner that when said space counter is initialized, and when said line feed code/space character detecting means detects the line feed code and immediately before said space counter is initialized, the blank line flag is set to on, whereas when said line feed code/space character detecting means detects a code or a character other than the line feed code and the space character and immediately before said space counter is initialized, the blank line flag is set to off; and
space character deletion means for deleting one space character existing at a head of a first line of the text data if the blank line flag is on when determination made by said count value determining means indicates that the value of said space counter is not two or more than two.

13. The data processing device according to claim 12, further comprising space character deletion means for deleting all space characters existing in the logical line if the blank line flag is on when said line feed code/space character detecting means detects the line feed code.

14. A data processing method comprising the steps of:
a) identifying whether a piece of data in a block of data containing one or plural pieces of data is text data or image data;
b) repeating step a) with respect to each piece of data contained in the block of data;
c) determining whether the one or plural pieces of data as identified in step a) include only the text data, only the image data, or both the text data and the image data;
d) laying out the one or plural pieces of data according to a layout pattern that differs depending upon the result of determination in step c); and
s) dividing, when determination made in step c) indicates that the one or plural pieces of data includes the text data and the image data, the layout area into a text area for laying out the text data and an image area for laying out the image data according to a predetermined ratio,
wherein said step d) comprises d1) laying out one or more image data, each of the one or more image data having been enlarged or reduced by the same proportion, into the image area; and d2) laying out one or more text data in the text area.

15. The data processing method according to claim 14, further comprising the steps of:
e) controlling a printing section to print the one or plural pieces of data on an elongated, web-like substrate having a width according to the layout pattern, controlling a cutting section to cut the substrate along the width each time the substrate is printed a predetermined length, and further controlling the cutting section to cut, when printing of the one or plural pieces of data has finished, the substrate along a line between a printed region and a non-printed region of the substrate.

16. The data processing method according to claim 14, further comprising the steps of:
  f) detecting, when determination made in step c) indicates that the one or plural pieces of data includes only the text data, a line feed code that may exist in the text data;
  g) detecting a prescribed code that may exist immediately before or after the line feed code detected during detection of the line feed code in step f); and
  h) deleting, when detection made in step g) indicates that the prescribed code is not detected in step g), the line feed code detected in step f).

17. The data processing method according to claim 14, further comprising the steps of:
  i) detecting, when determination made in step c) indicates that the one or plural pieces of data include only the text data, a space character code that may exist in the text data;
  j) incrementing a count value of a space counter by one each time when the space character code is consecutively detected from the text data, and initializing the count value of the space counter to zero when a code other than the space character code is detected in step i);
  k) determining, when the space character code is not detected from the text data, that the count value of the space counter is equal to or greater than two indicating that two or more than two space character codes consecutively exist in the text data; and
  l) deleting the two or more than two space character codes when determination made in step k) indicates that the count value of the space counter is equal to or greater than two.

18. The data processing method according to claim 14, further comprising the steps of:
  m) detecting that only one space character exists at a head of a first line of the text data when determination made in step c) indicates that the one or plural pieces of data include only the text data; and
  n) deleting the one space character when determination made in step m) indicates that a space character exists at the head of the first line of the text data.

19. The data processing method according to claim 14, further comprising the steps of:
  o) setting, when determination made in step c) indicates that the one or plural pieces of data includes only the image data, an order in which the one or plural pieces of data are arranged on a layout area; and
  p) producing a proportionally enlarged or proportionally reduced image data so that each piece of data is proportionally enlarged or proportionally reduced to a maximum size that fits within an unoccupied layout area, the proportionally enlarged or proportionally reduced image data being produced in the order in which the one or plural pieces of data are arranged on the layout area.

20. The data processing method according to claim 19, wherein in step d), the proportionally enlarged or proportionally reduced image data are laid out in an orientation on the layout area in the order set in step o).

21. The data processing method according to claim 20, further comprising the step of q) determining the orientation in which the proportionally enlarged or proportionally reduced image data are laid out on the layout area so that a firstly produced image data has a size that fits within the layout area.

22. The data processing method according to claim 19, further comprising the step of r) dividing the layout area into a predetermined number of partitioned areas, wherein the proportionally enlarged or proportionally reduced image data are produced so that each piece of data is proportionally enlarged or proportionally reduced to a maximum size that fits within a designated one of the predetermined number of partitioned areas when the proportionally enlarged or proportionally reduced image data is arranged in the orientation.

23. The data processing method according to claim 14, wherein laying out the one or plural pieces of data comprises laying out each identified piece of data in the block of data.

24. The data processing method according to claim 14, wherein the layout pattern is determined based on a layout process which differs depending on the determination result, the layout process determining an arrangement of the one or plural pieces of data on at least one of a recording medium and a display.

25. A data processing program implemented on a computer-readable recording medium, the data processing program comprising:
  an identification program for identifying whether a piece of data in a block of data containing one or plural pieces of data is text data or image data;
  a repeat program for repeatedly executing said identification program with respect to each piece of data contained in the block of data;
  a determination program for determining whether the one or plural pieces of data as identified through the execution of said repeat program include only the text data, only the image data, or both the text data and the image data, and providing a determination result; and
  a layout program for executing layout of the one or plural pieces of data according to a layout pattern that differs depending upon the determination result;
  an area dividing program for dividing, when determination made by said determination program indicates that the one or plural pieces of data includes the text data and the image data, the layout area into a text area for laying out the text data and an image area for laying out the image data according to a predetermined ratio, and said layout program comprises an image layout program for laying out one or more image data, each of the one or more image data having been enlarged or reduced by the same proportion, into the image area; and
  a text layout program for laying out one or more text data in the text area.

26. A data processing program implemented on a computer-readable recording medium, the data processing program comprising:
  an identification program for identifying whether a piece of data in a block of data containing one or plural pieces of data is text data or image data;
  a repeat program for repeatedly executing said identification program with respect to each piece of data contained in the block of data;
  a determination program for determining whether the one or plural pieces of data as identified through the execution of said repeat program include only the text data, only the image data, or both the text data and the image data, and providing a determination result;
  a layout program for executing layout of the one or plural pieces of data according to a layout pattern that differs depending upon the determination result;

a print program for instructing to print the one or plural pieces of data on an elongated, web-like substrate having a width according to the layout pattern used in said layout program;

a first cut program for instructing to cut the substrate along the width each time the substrate is printed a predetermined length; and a second cut program for instructing, when printing of the one or plural pieces of data has finished, to cut the substrate along a line between a printed region and a non-printed region of the substrate.

27. The data processing program according to claim 25, wherein identification executed by said identification program is made based on a format identifier attendant to each piece of data.

28. The data processing program according to claim 25, further comprising:
a line feed code detection program for detecting, when determination made by said determination program indicates that the one or plural pieces of data includes only the text data, a line feed code that may exist in the text data;
a prescribed code detection program for detecting a prescribed code that may exist immediately before or after the line feed code detected during detection of the line feed code by said line feed code detection program; and
a line feed code deletion program for deleting, when detection made by said prescribed code detection program indicates that the prescribed code is not detected through detection of the prescribed code by said prescribed code detection program, the line feed code detected through detection of the line feed code by said line feed code detection program.

29. The data processing program according to claim 28, wherein the prescribed code includes a punctuation code representative of a punctuation mark, a delimiting code representative of a period, comma, colon, or semicolon, and itemization code designed for using at a head of each line of a printed document in an itemization.

30. The data processing program according to claim 25, further comprising:
a space character code detection program for detecting, when determination made by said determination program indicates that the one or plural pieces of data include only the text data, a space character code that may exist in the text data;
a space counter control program for incrementing a count value of a space counter by one each time when the space character code is consecutively detected from the text data, and initializing the count value of the space counter to zero when a code other than the space character code is detected during detection the space character code by said space character code detection program;
a space code number determination program for determining, when the space character code is not detected from the text data, that the count value of the space counter is equal to or greater than two indicating that two or more than two space character codes consecutively exist in the text data; and
a space code deletion program for deleting the two or more than two space character codes when determination made in said space code number determination program indicates that the count value of the space counter is equal to or greater than two.

31. The data processing program according to claim 25, further comprising:
a space character detection program for detecting that only one space character exists at a head of a first line of the text data when determination made by said determination program indicates that the one or plural pieces of data includes only the text data; and
a space character deletion program for deleting the one space character when determination made in said space character detection program indicates that a space character exists at the head of the first line of the text data.

32. The data processing program according to claim 25, further comprising:
an arranging order setting program for setting, when determination made by said determination program indicates that the one or plural pieces of data includes only the image data, an order in which the one or plural pieces of data are arranged on a layout area; and
a proportional image data producing program for producing a proportionally enlarged or proportionally reduced image data so that each piece of data is proportionally enlarged or proportionally reduced to a maximum size that fits within an unoccupied layout area, the proportionally enlarged or proportionally reduced image data being produced in the order in which the one or plural pieces of data are arranged on the layout area.

33. The data processing program according to claim 32, wherein said layout program executes arranging in an orientation relative to the layout area, the proportionally enlarged or proportionally reduced image data on the layout area in the order set by said arranging order set program.

34. The data processing program according to claim 33, further comprising a layout orientation determining program for determining the orientation in which the proportionally enlarged or proportionally reduced image data are arranged on the layout area so that a firstly produced image data has a size that fits within the layout area.

35. The data processing program according to claim 32, further comprising a divided layout area setting program for dividing the layout area into a predetermined number of partitioned areas, and wherein said proportional image data producing program produces the proportionally enlarged or proportionally reduced image data so that each piece of data is proportionally enlarged or proportionally reduced to a maximum size that fits within a designated one of the predetermined number of partitioned areas when the proportionally enlarged or proportionally reduced image data is arranged in an orientation relative to the layout area.

36. The data processing program according to claim 35, further comprising a comparison program for comparing an enlargement/reduction ratio of the proportionally enlarged or proportionally reduced image data with a predetermined minimum reduction ratio.

37. The data processing program according to claim 36, wherein said layout program executes arranging the proportionally reduced image data over two or more partitioned areas upon dividing the proportionally reduced image data into a corresponding number when comparison executed by said comparison program indicates that the enlargement/reduction ratio of the proportionally reduced image data is smaller than the predetermined minimum reduction ratio.

38. The data processing program according to claim 37, further comprising a warning issuing program for issuing a warning to notify a user that the enlargement/reduction ratio of the proportionally reduced image data arranged over the two or more partitioned areas is smaller than the predetermined minimum reduction ratio.

39. The data processing program according to claim 25, wherein said text layout program executes arranging the text data in portions of the image area not occupied by image data.

40. The data processing program according to claim 39, wherein the predetermined ratio for dividing the layout area into the text area and the image area is variable.

41. The data processing program according to claim 40, further comprising a comparison program for comparing an enlargement/reduction ratio of the proportionally enlarged or proportionally reduced image data with a predetermined minimum reduction ratio, wherein the predetermined ratio is changed to increase the image area when comparison executed by said comparison program indicates that the enlargement/reduction ratio of the proportionally reduced image data is smaller than the predetermined minimum reduction ratio.

42. The data processing program according to claim 25, wherein the layout program executes layout of each identified piece of data in the block of data.

43. The data processing program according to claim 25, wherein the layout pattern is determined based on a layout process which differs depending on the determination result, the layout process determining an arrangement of the one or plural pieces of data on at least one of a recording medium and a display.

44. A computer-readable recording medium that stores a data processing program, the data processing program comprising instructions for:
   detecting a line feed code/space character that may exist in text data;
   detecting a prescribed code that may exist immediately before or after the line feed code detected by said line feed code/space character detecting step;
   deleting a line feed code, when said prescribed code detecting step indicates that the prescribed code is not detected, wherein the line feed code detected by said line feed code detecting step is deleted;
   incrementing a space counter by one each time said line feed code/space character detecting step consecutively detects the space character and initializing the space counter to zero when a code other than the space character code is detected by said line feed code/space character detecting step;
   when the code other than the space character code is detected by said line feed code/space character detecting step, determining whether a count value of said space counter is equal to or greater than two indicating that two or more than two space character codes consecutively exist in the text data; and
   deleting the two or more than two space character codes when said count value determining step determines that the count value of the space counter is equal to or greater than two.

45. The computer readable recording medium of claim 44, wherein the data processing program further comprises instructions for:
   storing a blank line flag representing whether a character other than a space character exists before a line feed code in one logical line;
   controlling on/off of the blank line flag in such a manner that when said space counter is initialized, and when said line feed code/space character detecting step detects the line feed code and immediately before said space counter is initialized, the blank line flag is set to on, whereas when said line feed code/space character detecting step detects a code or a character other than the line feed code and the space character and immediately before said space counter is initialized, the blank line flag is set to off; and
   a space character deleting step for deleting one space character existing at a head of a first line of the text data if the blank line flag is on when said count value determining step determines that the value of said space counter is not two or more than two.

46. The computer readable recording medium of claim 45, wherein the data processing program further comprises instructions for:
   deleting all space characters existing in the logical line if the blank line flag is on when said line feed code/space character detecting step detects the line feed code.

* * * * *

UNITED STATES PATENT AND TRADEMARK OFFICE
CERTIFICATE OF CORRECTION

PATENT NO. : 7,184,167 B1  
APPLICATION NO. : 09/672033  
DATED : February 27, 2007  
INVENTOR(S) : Chitoshi Ito et al.

It is certified that error appears in the above-identified patent and that said Letters Patent is hereby corrected as shown below:

Please amend the title page as follows:

Item (75), please change "Chitoshi Ito, Kasugai (JP); Hirokazu Kuwabara, Nagoya (JP); Tatsuhiro Ikedo, Nagoya (JP)" to --Chitoshi Ito, Kasugai (JP); Kazuhiko Iwanaga, Nagoya (JP); Hirokazu Kuwabara, Nagoya (JP); Tatsuhiro Ikedo, Nagoya (JP)--

Signed and Sealed this

Twenty-ninth Day of May, 2007

JON W. DUDAS  
*Director of the United States Patent and Trademark Office*